(12) United States Patent
Saito et al.

(10) Patent No.: US 8,342,633 B2
(45) Date of Patent: Jan. 1, 2013

(54) DOT RECORDING DEVICE, DOT RECORDING METHOD AND RECORDING MEDIUM RECORDING COMPUTER PROGRAM THEREON

(75) Inventors: Toshiki Saito, Matsumoto (JP); Hironori Matsuoka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 397 days.

(21) Appl. No.: 12/785,753

(22) Filed: May 24, 2010

(65) Prior Publication Data

US 2010/0321429 A1    Dec. 23, 2010

(30) Foreign Application Priority Data

Jun. 22, 2009  (JP) ................................ 2009-147344

(51) Int. Cl.
*B41J 2/205* (2006.01)
(52) U.S. Cl. ................ 347/15; 347/12; 347/41
(58) Field of Classification Search .................. 347/5, 9, 347/12, 14, 15, 40, 41
See application file for complete search history.

(56) References Cited

U.S. PATENT DOCUMENTS

| | | | |
|---|---|---|---|
| 6,099,104 A * | 8/2000 | Sato et al. ........................ | 347/15 |
| 6,729,710 B2 * | 5/2004 | Chikuma et al. ................. | 347/14 |
| 2010/0201731 A1 | 8/2010 | Saito | |

FOREIGN PATENT DOCUMENTS

JP    2001-030522 A    2/2001

OTHER PUBLICATIONS

U.S. Office Action for U.S. Appl. No. 12/785,637, issued Aug. 29, 2012. (5 pages).

* cited by examiner

*Primary Examiner* — Lam S Nguyen
(74) *Attorney, Agent, or Firm* — Nutter McClennen & Fish LLP; John J. Penny, Jr.; Christina M. Sperry

(57) ABSTRACT

A recording medium recording a computer readable computer program thereon, where the computer program enables the computer to generate dot recording data supplied to a dot recording device in order to perform dot recording using the dot recording device which repeats a main scanning pass and a transport based on the dot recording data so that a raster line along a main scanning direction is formed in multiple lines in a sub-scanning direction on a printing medium, where the main scanning pass is for performing the dot recording on the printing medium when an output head having a plurality of nozzles arranged in the sub-scanning direction moves in the main scanning direction, and where the transport is for enabling the printing medium to move in the sub-scanning direction, the computer program enables the computer to implement the functions of: determining a dot reduction degree for reducing the dot recording; setting a recording position of a changing target dot included in the dot recording data, according to the dot reduction degree, based on an order of performing the dot recording, where the changing target dot undergoes at least one of a thinning-out processing where the dot recording is not performed and a dot diameter shrinkage where dot size is reduced; and generating the dot recording data in which the recording position of the changing target dot is set.

16 Claims, 16 Drawing Sheets

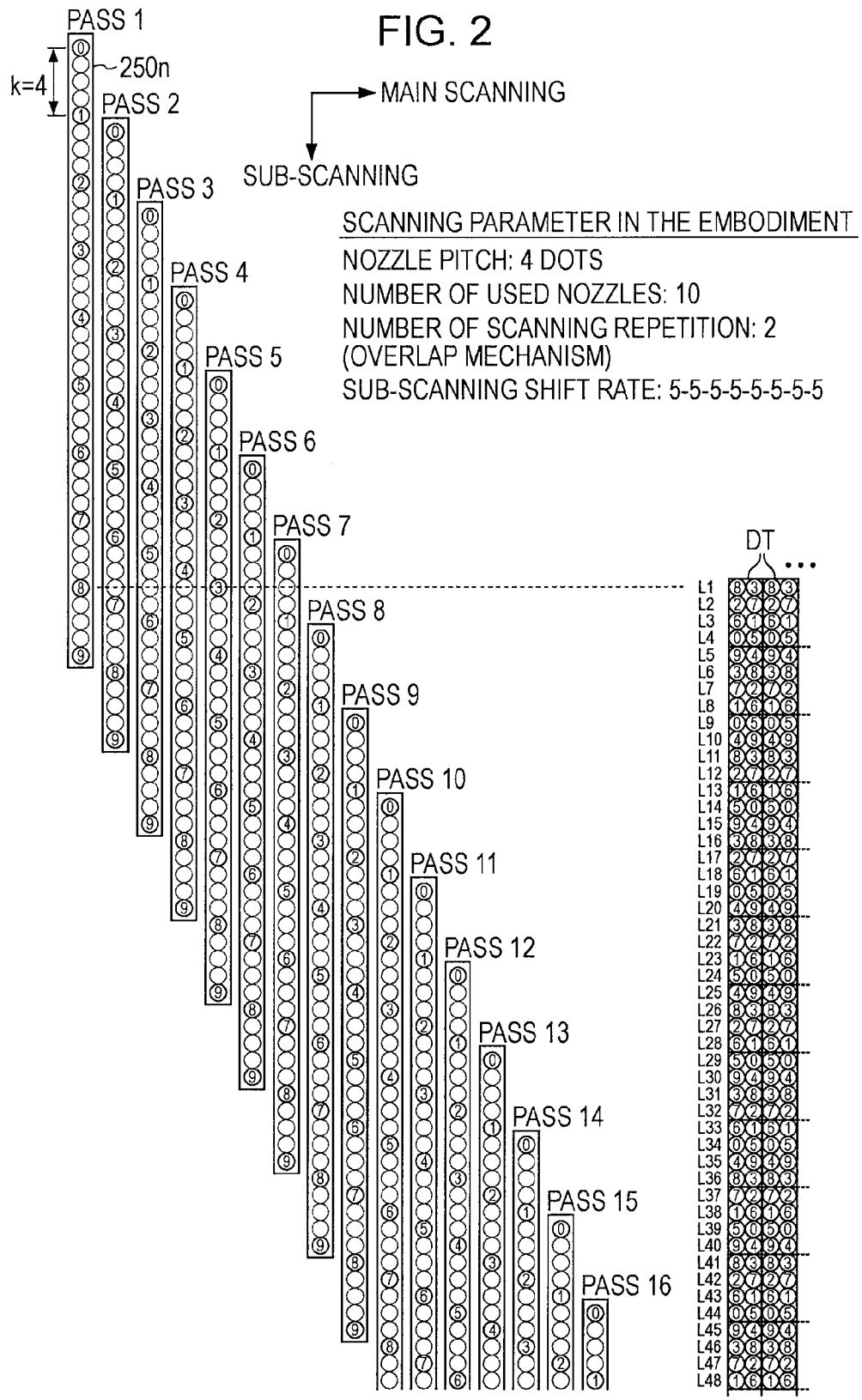

FIG. 3A
DOT SIZE
LARGE DOT　　MIDDLE DOT　　SMALL DOT
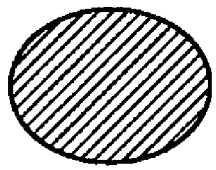 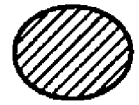 
FIG. 3B
DOT RECORDING IN BETA REGION
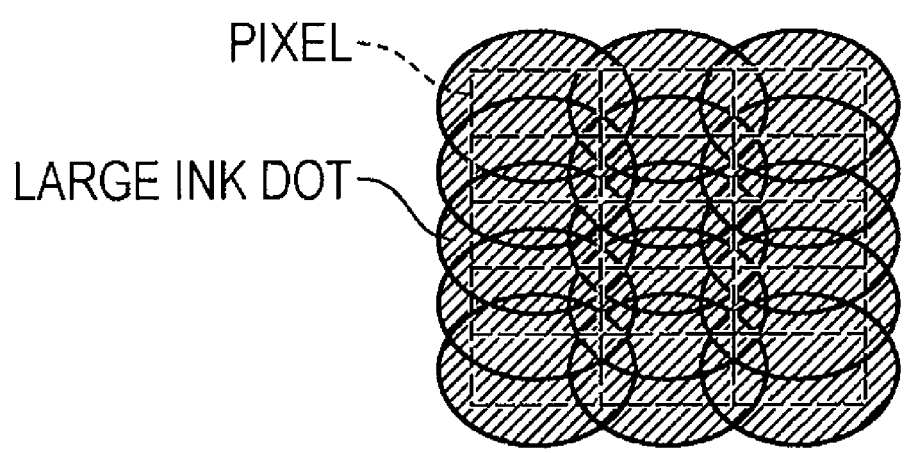

EMBODIMENT: 4/8 DOT REDUCTION (THINNING-OUT)

COMPARATIVE EXAMPLE: 4/8 THINNING-OUT

DOT RECORDING DEVICE, DOT RECORDING METHOD AND RECORDING MEDIUM RECORDING COMPUTER PROGRAM THEREON

BACKGROUND

1. Technical Field

The present invention relates to a technique to record dots on a dot recording medium.

2. Related Art

An ink jet printer, which is a representative device, performs dot recording by outputting color material such as ink or the like. In the ink jet printer, improvement of cost performance is desired by reducing as much as possible the amount of the ink used. In order to reduce the amount used, a method for thinning out ink dots is known (JP-A-2001-30522 is an example of a related art).

However, the method for merely thinning out the ink dots has a problem in that image quality deterioration is excessive due to the decrease in printing concentration. This problem is not limited to ink jet printers but is common to color material output devices which record dots on a dot recording medium by outputting color material.

SUMMARY

An advantage of some aspects of the invention is to provide a technique capable of reducing the amount of color material used for recording dots without excessively deteriorating image quality.

The invention can be implemented by the following embodiments or applications.

Application 1: Dot Data Generation Device

A dot data generation device, which generates dot recording data which determines recording positions of dots which are recorded on a printing medium by a dot recording device, includes: an output section which outputs the dot recording data to the dot recording device which repeats a main scanning pass and transport based on the dot recording data so that a raster line along a main scanning direction is formed in multiple lines in a sub-scanning direction on the printing medium, where the main scanning pass is for performing dot recording on the printing medium when an output head having a plurality of nozzles arranged in the sub-scanning direction moves in the main scanning direction, and where the transport is for enabling the printing medium to move in the sub-scanning direction; a dot reduction degree determination section which determines a dot reduction degree for reducing the dot recording; and a thinning-out processing section which sets a recording position of changing target dot included in the dot recording data, according to the dot reduction degree, based on an order of performing the dot recording, where the changing target dot undergoes at least one of a thinning-out processing where dot recording is not performed and a dot diameter shrinkage where dot size is reduced.

The dot data generation device with the above-described configuration outputs the dot recording data for determining the recording positions of the dots to the dot recording device, determines the dot reduction degree of the dots recorded by the nozzles, and sets the recording position of the changing target dot according to the determined dot reduction degree. This changing target dot undergoes at least one of a thinning-out processing where the dot recording is not performed and a dot diameter shrinkage where dot size is reduced, according to the dot reduction degree. Thereby, as for the changing target dot, an output of the nozzle is reduced as much as the dot becomes smaller by the dot diameter shrinkage or the thinning-out degree, and thus it is possible to reduce color material in proportion to the output of the nozzle. In addition, in the dot for which the dot recording is performed by the dot diameter shrinkage, although the size of the dot becomes smaller, since the dot recording has been performed, it is possible to suppress excessive image quality deterioration as compared with when the dot is merely thinned out.

The dot data generation device with the above-described configuration makes the size of the dot recorded by the dot diameter shrinkage smaller, and thereby this size change can be set at various steps. For example, the size of the dot can be changed from a large dot to a medium dot, from a large dot to a small dot, or a large dot to a mixture of a medium dot and a small dot. Of course, the size can be changed to other sizes. Therefore, it is possible to finely achieve reduction of the color material in proportion to reduction of the nozzle output.

The above-described dot data generation device may have the following aspect. For example, a dot recording region taken up by M×N dots, where there are N consecutive dots in the main scanning direction with respect to M raster lines, is designated as a constitution unit of the dot recording data, and the M×N dots in the dot recording region are sequentially recorded on the printing medium by M×N main scanning passes. Also, in the dot data generation device with the above-described configuration, when the dot recording region is recorded by M×N main scanning passes, the order of performing the dot recording is not consecutive in the sub-scanning direction column in the dot recording region. Thereby, in the dot recording region, the recording positions of the dots can be set so that the order of performing the dot recording is consecutive in the raster lines adjacent in the sub-scanning direction. Therefore, in the case of the dots except for the changing target dot which is a target of the thinning-out or the size diameter shrinkage, the pass number indicating the number of main scanning passes remain on the raster lines corresponding to the adjacent main scanning passes when performing M×N main scanning passes, and thereby it is possible to reduce a sub-scanning shift error which is accumulated between the main scanning passes for recording the adjacent raster lines. As a result, it is possible to reduce the amount of color material used as described above, without excessively deteriorating image quality. Also, it is possible to handle the dot recording data for each dot recording region which is a data constitution unit.

The dot data generation device determines the recording position of the changing target dot of the M×N dots in the dot recording region, according to the dot reduction degree, in the order of performing the dot recording. Thereby, since the thinning-out processing or the dot diameter shrinkage for the changing target dots of the number corresponding to the dot reduction degree is performed for the dots consecutive in the order of performing the dot recording, the thinning-out of various thinning-out degrees can be realized, and thus it is possible to suppress excessive image quality deterioration and reduce the amount of color material used when the thinning-out processing or the dot diameter shrinkage according to each of the dot reduction degrees is performed. When the recording of the changing target dot is determined in this way, the order of performing the dot recording can be sequentially determined starting from a first dot in the dot recording region, or the order of performing the dot recording is sequentially determined starting from a last dot in the dot recording region, which is thus simple.

Also, the dot recording data may be assembled by repeatedly forming the dot recording region in which the recording position of the changing target dot is determined in the order of performing the dot recording, in the main scanning direction and in the sub-scanning direction, and the assembled dot recording data may be output to the dot recording device. In this way, it is possible to perform the dot recording in order to suppress excessive image quality deterioration and reduce the amount of color material used, in the dot recording device which receives the inputting of the dot recording data. Since the dot recording regions with the same dot recording order are arranged in the main scanning direction in the dot recording data, there can be a reduction in operation load needed for determining the changing target dot which is a target of the thinning-out processing or the dot diameter shrinkage or assembling the dot recording data, and thus it is possible to perform high speed processing.

A dot recording device has the following configuration.

Application 2: Dot Recording Device

The dot recording device, which repeats a main scanning pass and a transport based on dot recording data so that a raster line along a main scanning direction is formed in multiple lines in a sub-scanning direction on a printing medium, where the main scanning pass is for performing dot recording on the printing medium when an output head having a plurality of nozzles arranged in the sub-scanning direction moves in the main scanning direction, and where the transport is for enabling the printing medium to move in the sub-scanning direction, includes: a dot reduction degree determination section which determines a dot reduction degree for reducing the dot recording; a thinning-out processing section which sets a recording position of a changing target dot included in the dot recording data, according to the dot reduction degree, based on an order of performing the dot recording, where the changing target dot undergoes at least one of a thinning-out processing where the dot recording is not performed and a dot diameter shrinkage where dot size is reduced; and a dot data generation section which generates the dot recording data in which the recording position of the changing target dot is set.

In this case, the dot recording device may be an ink jet printer.

A dot recording method has the following configuration.

Application 3: Dot Recording Method

The dot recording method, which repeats a main scanning pass and a transport based on dot recording data so that a raster line along a main scanning direction is formed in multiple lines in a sub-scanning direction on a printing medium, where the main scanning is for performing dot recording on the printing medium when an output head having a plurality of nozzles arranged in the sub-scanning direction moves in the main scanning direction, and where the transport is for enabling the printing medium to move in the sub-scanning direction, includes: determining a dot reduction degree for reducing the dot recording; setting a recording position of a changing target dot included in the dot recording data, according to the dot reduction degree, based on an order of performing the dot recording, where the changing target dot undergoes at least one of a thinning-out processing where the dot recording is not performed and a dot diameter shrinkage where dot size is reduced; and generating the dot recording data in which the recording position of the changing target dot is set.

A computer program has the following configuration.

Application 4: Computer Program

The computer program enables a computer to generate dot recording data supplied to a dot recording device in order to perform dot recording using the dot recording device which repeats a main scanning pass and a transport based on the dot recording data so that a raster line along a main scanning direction is formed in multiple lines in a sub-scanning direction on a printing medium, where the main scanning pass is for performing the dot recording on the printing medium when an output head having a plurality of nozzles arranged in the sub-scanning direction moves in the main scanning direction, and where the transport is for enabling the printing medium to move in the sub-scanning direction, and the computer program enables the computer to implement the functions of: determining a dot reduction degree for reducing the dot recording; setting a recording position of a changing target dot included in the dot recording data, according to the dot reduction degree, based on an order of performing the dot recording, where the changing target dot undergoes at least one of a thinning-out processing where the dot recording is not performed and a dot diameter shrinkage where dot size is reduced; and generating the dot recording data in which the recording position of the changing target dot is set.

The invention can be implemented by various kinds of embodiments, for example, by a printing method and a printing device, a color material output device, a printing control method and a printing control device, or a recording medium recording a computer program realizing such methods or the functions of such devices thereon.

BRIEF DESCRIPTION OF THE DRAWINGS

The invention will be described with reference to the accompanying drawings, wherein like numbers reference like elements.

FIG. 2 is a diagram illustrating a dot recording method according to an embodiment of the invention.

FIG. 3A is a diagram schematically illustrating a kind of ink dots which an ink jet printer can form.

FIG. 3B shows the beta region of five rows by three columns printed using the large dot.

FIG. 7 is a diagram illustrating a thinning-out processing when a dot reduction degree is equal to or less than 50% in the thinning-out processing according to this embodiment.

FIG. 9 is a diagram illustrating the difference between a thinning-out in a comparative example when the dot reduction degree is 50% and the thinning-out in this embodiment.

DESCRIPTION OF EXEMPLARY EMBODIMENTS

Figure 1:
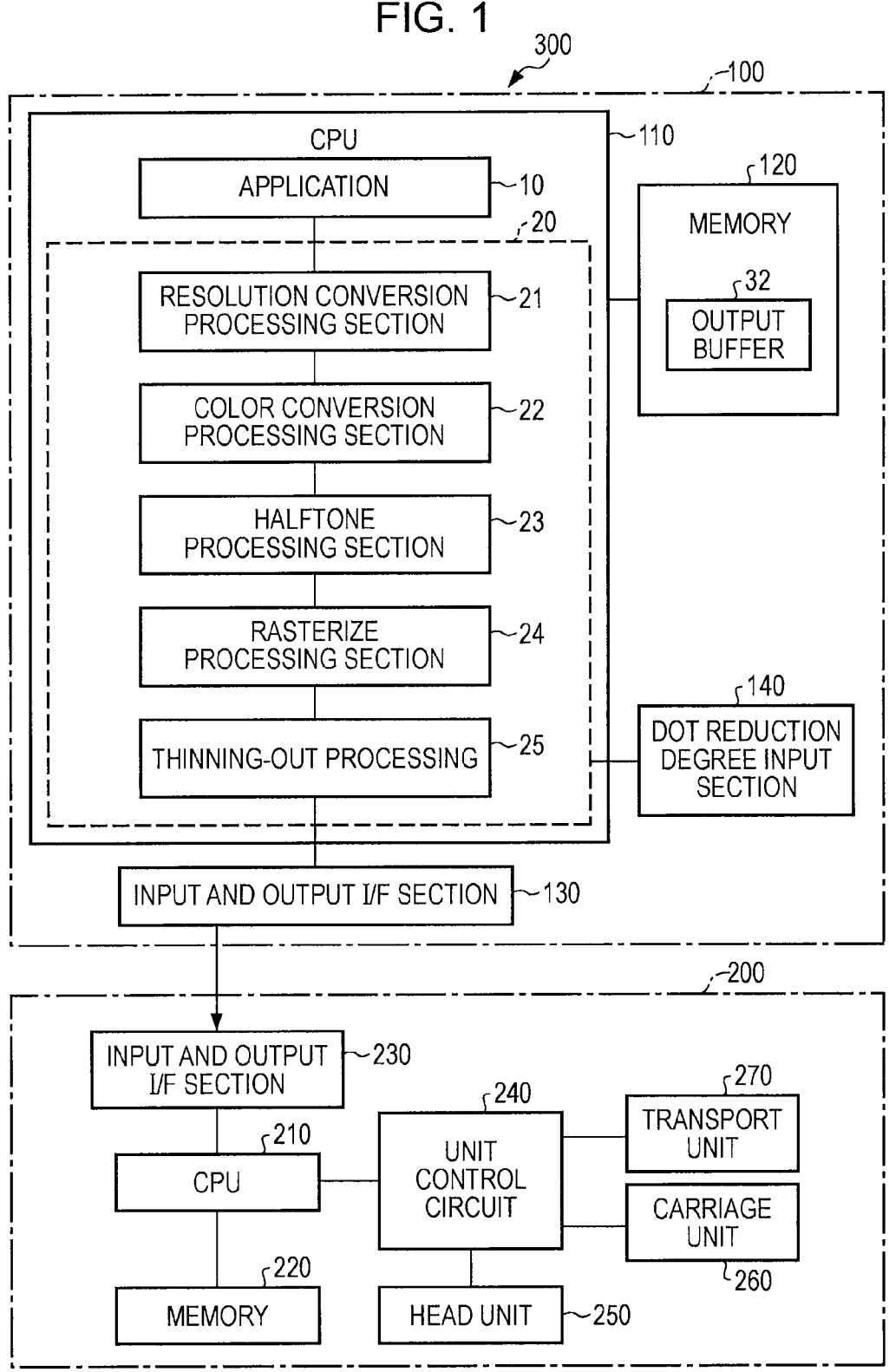
FIG. 1 is a diagram illustrating a configuration of a printing system according to an embodiment of the invention.

Hereinafter, embodiments of the invention will be described in the following order.
A. Configuration of a device
B. Embodiments
C. Modified Examples
A. Configuration of a Device FIG. 1 is a diagram illustrating a configuration of a printing system according to an embodiment of the invention. This printing system 300 has a personal computer 100 which is an image processing device and a printer 200 connected to the personal computer 100.

The personal computer 100 has a CPU 110, a memory 120, an input and output interface (I/F) section 130, and a dot reduction degree input section 140. The memory 120 has an output buffer 32 storing printing data (dot data). The dot reduction degree input section 140, as described later, treats a dot group of four rows by two columns as a dot recording region DT which is a dot constitution unit, and performs changing of a dot size (diameter shrinkage of a dot) and thinning-out for each dot, thereby arbitrarily selecting a dot reduction degree corresponding to a color material cutback ratio of between 0% to 100%. This dot reduction degree is selected by a user; however, the dot reduction degree is practically used in a range of 10% to 75% in terms of maintenance of image quality. This is because a dot reduction exceeding 75% has a problem that the reduction degree is excessive.

Various kinds of computer programs such as an application program 10 or a printer driver 20, or the like, are installed in the personal computer 100. The application program 10 or the printer driver 20 is executed by the CPU 110 under the control of a predetermined operating system (not shown). In addition, the printer driver 20 may run in the personal computer 100 or the printer 200.

The application program 10 is a program for realizing, for example, an image edition function. A user can give an instruction for printing an image edited by the application program 10, via a user interface supplied by the application program 10. When an instruction for printing from the user is received, the application program 10 outputs image data which is a printing target to the printer driver 20. In this embodiment, the image data is output as RGB data.

The printer driver 20 is a program for realizing a function of generating printing data, based on the image data output from the application program 10. Here, the printing data is data of a format which can be interpreted by the printer 200, and includes various kinds of command data and dot data. The command data is data for instructing the printer 200 to execute a specific operation. The dot data is data indicating a dot formation state in a pixel (printing pixel) constituting an image which will be printed (printing image). In detail, it is data indicating if a dot with which size and color is formed in each printing pixel (or if a dot is not formed). Here, the "dot" refers to one ink region formed by an ink output from the printer 200 landing on a printing medium.

The printer driver 20 converts the image data output from the application program 10 into the printing data, and has a resolution conversion processing section 21, a color conversion processing section 22, a half tone processing section 23, a rasterize processing section 24, and a thinning-out processing section 25.

The resolution conversion processing section 21 converts resolution of the image data output from the application program 10 so that it matches the printing resolution of the printer 200. The color conversion processing section 22 carries out color conversion processing for the image data. The printer 200 used in this embodiment is a printer performing printing using ink of each color, cyan (C), magenta (M), yellow (Y) and black (K). For this reason, the color conversion processing section 22 converts a pixel value represented by an RGB value into a CMYK value. The half tone processing section 23 performs a half tone processing for the pixel value after the color conversion to form dot data. As the half tone processing, for example, an error diffusion method, or a dither method using a dither matrix may be used. In addition, the printer 200 used in this embodiment is a printer capable of forming three kinds of dots sizes, a small dot, a medium dot and a large dot. However, the printer 200 is not limited to that capable of forming the three kinds of dot sizes, but it is possible to use a printer capable of forming dot sizes equal to or more than one kind. The rasterize processing section 24 changes an arrangement of the dot data able to be obtained by the half tone processing into an order to be transmitted to the printer 200. The thinning-out processing section 25 performs the thinning-out processing described later for the dot data. The dot data for the thinning-out processing is temporarily stored in an output buffer 32 and is output to the printer 200 via the input and output interface section 130.

The printer 200 in this embodiment is an ink jet printer which prints an image by forming ink dots on a printing medium. The printer 200 has a CPU 210, a memory 220, an input and output interface (I/F) section 230, a unit control circuit 240 which controls various kinds of units depending on instructions from the CPU 210, a head unit 250, a carriage unit 260, and a transport unit 270.

The head unit 250 has a printing head (not shown) for outputting ink to a printing medium. The head unit 250 has a plurality of nozzles arranged in a sub-scanning direction for each ink and enables each nozzle to intermittently output ink. This head unit 250 is mounted on the carriage unit 260, thereby if the carriage unit 260 moves in a predetermined scanning direction (main scanning direction), the head unit 250 also moves in the main scanning direction. The head unit 250 moves in the main scanning direction, enables the nozzles to intermittently output the ink, and thereby forms a dot line on a printing medium along the main scanning direction. In this specification, the main scanning line is also referred to as a "raster line."

The carriage unit 260 is a driving device which enables the head unit 250 to reciprocate in the main scanning direction. The carriage unit 260 has an ink cartridge which is attachable and detachable and contains ink, in addition to the head unit 250. The transport unit 270 is a driving device which performs the sub-scanning by transporting a printing medium. The transport unit 270 is constituted by a paper feed roller, a transport motor, a transport roller, a platen, and a paper discharge roller (not shown) and so on. In addition, instead of the printing medium, the printing head may be transported in the sub-scanning direction.

B. Embodiments

FIG. 2 is a diagram illustrating a dot recording method according to an embodiment of the invention. A nozzle line 250*n*, which is disposed in the head unit, is shown in the left in FIG. 2. The nozzle line 250*n* has ten nozzles for spraying one kind of ink (for example, a black ink). Nozzle lines for other inks are not shown. Several tens to several hundreds of nozzles are disposed for one kind of ink in an actual printer, but, for convenience of illustration, the nozzle line with a smaller number of nozzles is shown herein. The numbers 0 to 9 added to the respective nozzle positions are numbers (ID) for identifying the nozzles. A pitch k in the sub-scanning direction of the nozzle is, for example, 180 dpi, and a pitch of the printing pixel is, for example, 720 dpi. In this case, the pitch k is four "dots." Generally, the pitch k is an integer equal to or more than 2. The nozzle line 250*n* records dots on a printing medium along the main scanning direction (transverse direction in the figure) while the main scanning is being carried out. In FIG. 2, the "pass" means the main scanning pass, and the numbers added to the "pass" are pass numbers indicating the number of main scanning passes. Each time the main scanning is performed one time, the nozzle line 250*n* moves in the sub-scanning direction (longitudinal direction in the figure) and thereby the pass number after the movement is larger than the pass number before the movement by 1. In this example, the sub-scanning shift rate is a constant 5 dots, and the position of the nozzle line 250*n* is shown in terms of 16 main scanning passes. In addition, a printing medium actually moves; however, for convenience of illustration, the nozzle line 250*n* is shown so as to move herein.

The circle shown in the right in FIG. 2 indicates a recorded ink dot and the number in the circle indicates the nozzle number. The signs "L1" to "L48" indicate line numbers of consecutive numbers added to the main scanning lines. For example, in the main scanning line L1, dot recording is performed alternately for each pixel by the nozzle number 8 and the nozzle number 3. As can be seen from referring to the left in FIG. 2, the dot recording by the nozzle number 8 on the main scanning line L1 is performed during the main scanning pass with the pass number 1, and the dot recording by the nozzle number 3 thereon is performed during the main scanning pass with the pass number 5. In this example, all the dots on each main scanning line are recorded by two main scanning passes. In other words, all the dots on each main scanning line are recorded by two different nozzles. This printing is called a "two-pass printing." In this specification, printing, which records dots on each main scanning line by use of N nozzles by N main scanning passes, is referred to as an "overlap printing." Also, the number N of main scanning passes needed for finishing the printing concerning the each main scanning line may be set to an arbitrary number equal to or more than 2. Generally, the reason why the printing for each raster line is performed by several main scanning passes is that the recording position of the dot is probably a little misaligned due to a manufacturing error of the printing head or a sub-scanning shift error and therefore a difference between dots is hardly recognized by printing one line using different plural nozzles, in order to improve an image quality. The signs "L1" to "L48" in shown in FIG. 2 can be considered as the raster line numbers arranged in the sub-scanning direction.

In this embodiment, as described later, the dot recording region DT taken up by the dots of four rows by two columns is considered as a constitution unit for performing dot recording, and a dot recording order and a dot recording position are set for each dot recording region DT. The eight dots are arranged in four rows by two columns in this dot recording region DT, and thus the dot recording in the dot recording region DT is completed by the consecutive eight main scanning passes (if related to the pass number, the main scanning passes of the consecutive eight pass numbers) and ink dots from different nozzles for each of the main scanning passes. While the main scanning pass progresses, ink dots can be simultaneously output from different nozzles with respect to the main scanning pass of the same pass number. For example, in the main scanning pass with the pass number 8 in FIG. 2, ink dots are output from all the nozzles of the nozzle numbers 0 to 9. Therefore, the dot recording is performed in the main scanning passes of consecutive eight pass numbers for each dot recording region DT; however, the arrangement of the consecutive eight pass numbers is changed according to a position taken up by the dot recording region DT (that is, the progress of the main scanning pass). This will be described later.

FIG. 3 is a diagram illustrating a kind of ink dots which the ink jet printer can form. This printer can form three kinds of dots, a large dot, a medium dot and a small dot, in a region of one printing pixel. FIG. 3A shows these dots schematically. The large dot is used for mainly printing a beta region or a high concentration region, and the small dot is used for mainly printing a low concentration region. For example, the beta region is frequently printed by only using the large dot, and a highlight region (very low concentration region) is frequently printed by only using the small dot. The medium dot is used more than the large dot or the small dot, in an intermediate concentration region. FIG. 3B shows the beta region of five rows by three columns printed using the large dot. The range of one pixel is shown by the broken line. A shape of one pixel may be a rectangle of which a transverse side is longer, or may be a square. The large dot is a dot which is spread in a wide region so as to entirely include a region of one pixel, and the large dot in the center overlaps with each of eight large dots surrounding it. Typically, ink is sprayed while the head moves in the main scanning direction (transverse direction in the figure), and thus there is a tendency that the dots are greatly spread in the transverse direction on a printing medium. Therefore, when the dots are thinned out in order to reduce the amount of ink used, the dots are thinned out at one pixel interval along the main scanning direction, and this has an advantage that image quality deterioration is hardly visible.

As shown in FIG. 3, if seen from a main scanning pass including a changing target dot, the thinning-out processing in this embodiment includes a medium size diameter shrinkage in which the size is changed from the large dot size to the medium dot size, a small size diameter shrinkage in which the size is changed from the large dot size to the small dot size, and the thinning-out in which dot recording using the large dot size is not performed, with respect to the dot recording of the changing target dot in the main scanning pass. In addition, when main scanning passes including changing target dots are consecutive in their pass numbers, dot recording of the changing target dot is thinned out in a main scanning pass with the smaller pass number, and thereafter dot recording of the changing target dot undergoes, in a main scanning pass with the pass number subsequent thereto, the medium size diameter shrinkage, the small size diameter shrinkage, or the thinning-out so as to increase the pass number of the main scanning pass, and this process is repeatedly performed. This will be described later in detail. In addition, as for the dot recording of the changing target dot in the main scanning pass, the medium size diameter shrinkage and the small size diameter shrinkage may be carried out so that the reproduction rates thereof are varied.

Figure 4:
FIG. 4 is a diagram illustrating the relation between the pass number for the main scanning pass and the nozzle number in the detailed dot recording method in FIG. 2.
Figure 5:
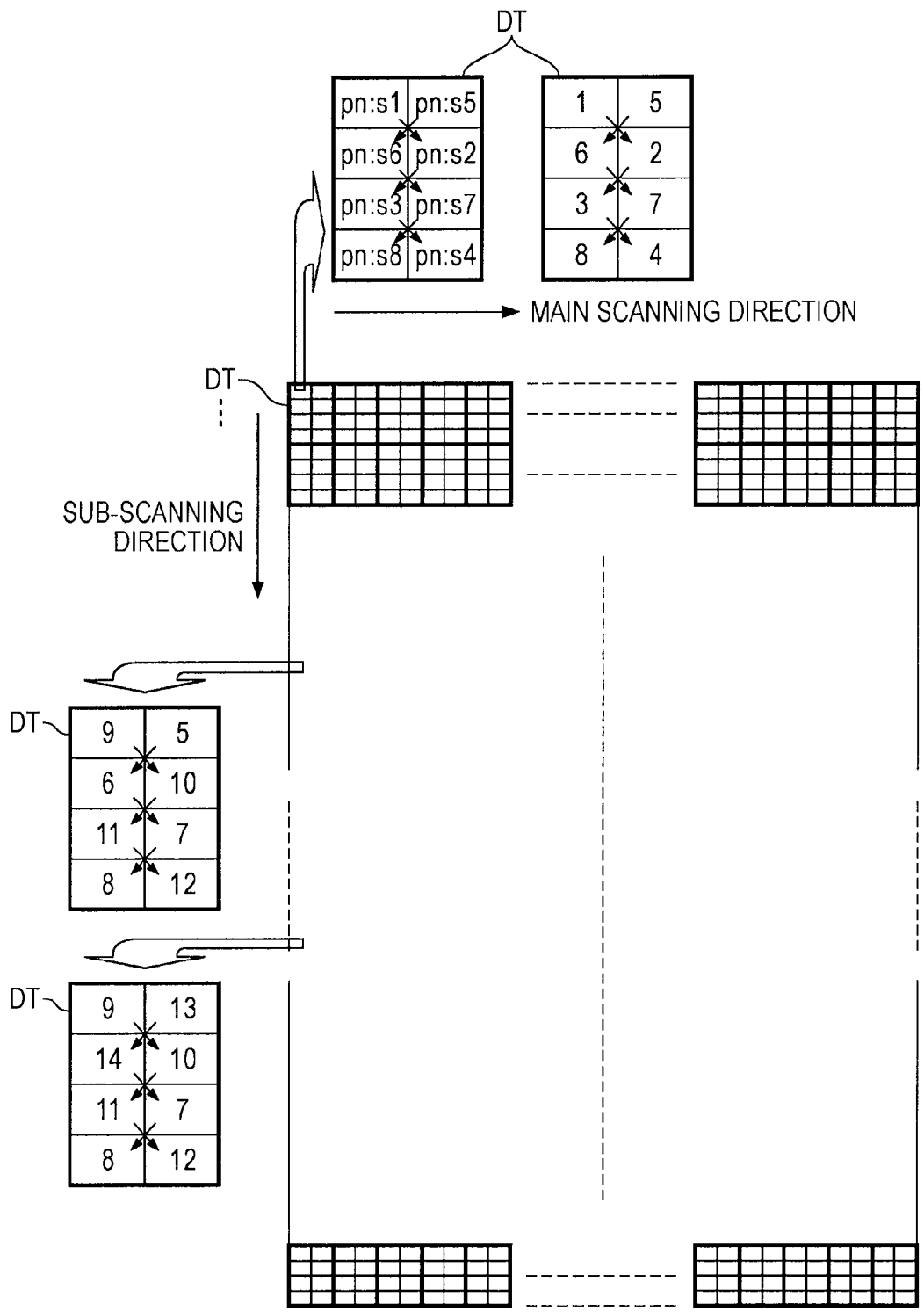
FIG. 5 is a diagram illustrating an arrangement of the pass numbers in the dot recording region DT.

FIG. 4 is a diagram illustrating the relation between the pass number for the main scanning pass and the nozzle number in the detailed dot recording method in FIG. 2, and FIG. 5 is a diagram illustrating an arrangement of the pass numbers in the dot recording region DT.

One pixel (one dot) is shown using one frame in FIG. 4, and, in the left in the figure, the pass number for the main scanning pass and the nozzle number for performing dot recording in the pixel are shown inside one pixel. In the right in the figure, only the pass number for the main scanning pass is shown inside the pixel. As described above, the dot recording region DT taken up by the dots of four rows by two columns are continuous in the main scanning pass direction and in the sub-scanning direction, and this is shown in FIG. 5. In this case, the pass numbers for the main scanning passes are shown in FIG. 5.

Here, the pass numbers for the main scanning passes and the dot recording order in the dot recording region DT will be described. As shown in FIG. 5, an order of performing dot recording of the dots of four rows by two columns taking up the dot recording region DT is set related to the pass numbers for the main scanning passes in the dot recording region DT so that a recording order is increased among the dots placed obliquely, in development of the respective lines in the arrangement of the dots of four rows by two columns. For example, in the dot recording region DT placed on the top left in FIG. 5 where the number of the main scanning lines is small, the dots in the dot recording region DT are recorded in the main scanning passes of the pass numbers 1 to 8, and the dot recording order thereof has an increasing order from the earliest pass number 1 to 2→3→4 among the dots placed obliquely, and that of the remaining dots also has an increasing order of 5→6→7→8 among the dots placed obliquely.

When the main scanning pass is performed, the pass number for the main scanning pass is changed in the dot recording region DT as described above, and thereby, as shown in FIG. 5, the dot recording order has an increasing order from the earliest pass number 5 to 6→7→8 among the dots placed obliquely in the dot recording region DT, and that of the remaining dots also has an increasing order of 9→10→11→12 among the dots placed obliquely. However, when the main scanning pass is performed, the eight pass numbers are arranged in the dot recording region DT according to the order of the pass numbers; however, the earliest pass number does not necessarily match the uppermost column in the dot recording region DT. In this case, as shown in FIG. 5, the dot recording order is set so that the pass number is obliquely increased from the dot matching the pass number 7 to the pass number 8 and the dot recording order of the other dots is set so that the pass number is increased from the pass number 9 as described above. As above, since the recording order is increased among the dots placed obliquely in the arrangement of the dots of four rows by two columns with respect to the dot recording region DT, the pass numbers are not consecutive at every line through each column in the sub-scanning direction in the dot recording region DT, and thereby the order for recording the dots (dot recording order) is also not consecutive at every line through each column in the sub-scanning direction in the dot recording region DT.

Figure 6:
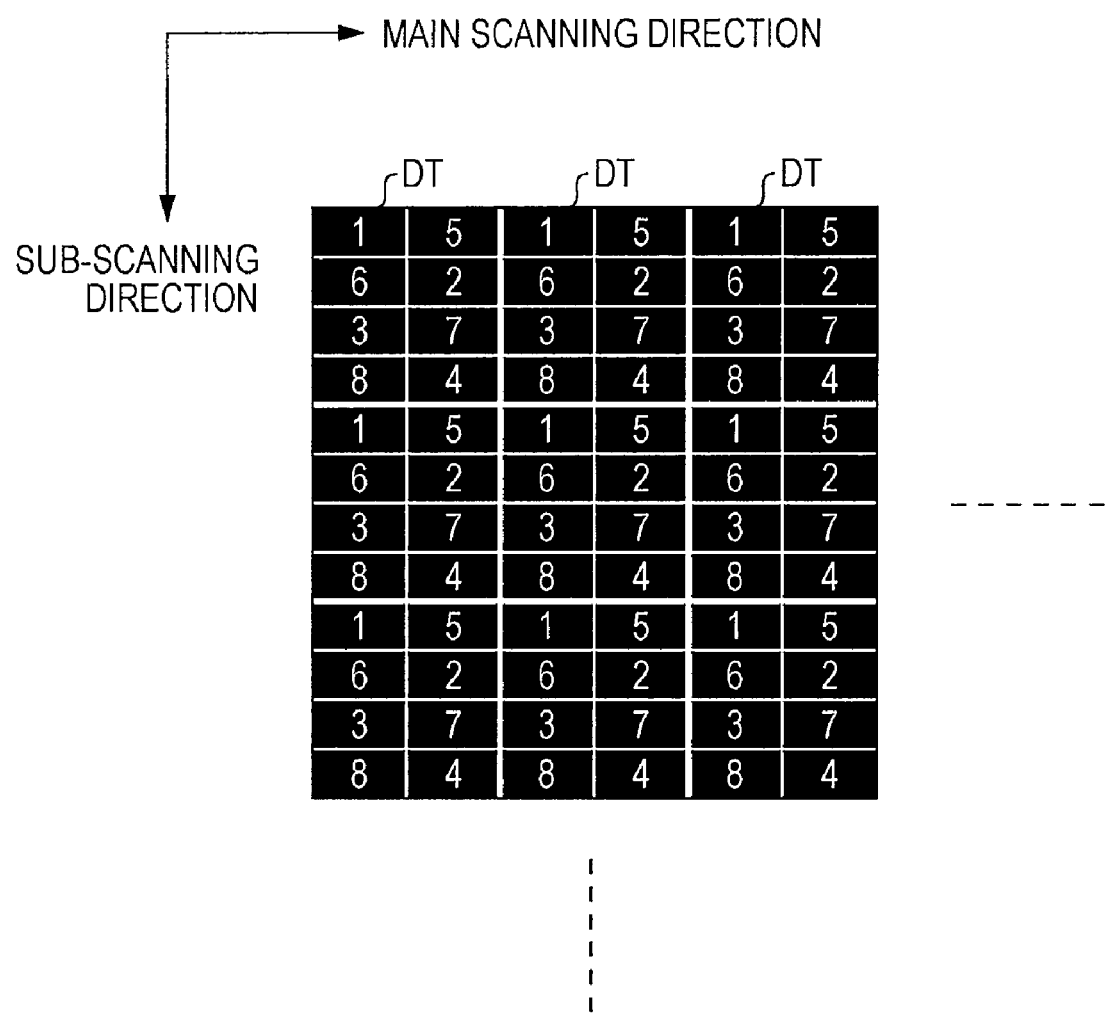
FIG. 6 is a diagram illustrating a no thinning-out state where the thinning-out processing is not performed according to this embodiment.
Figure 7:
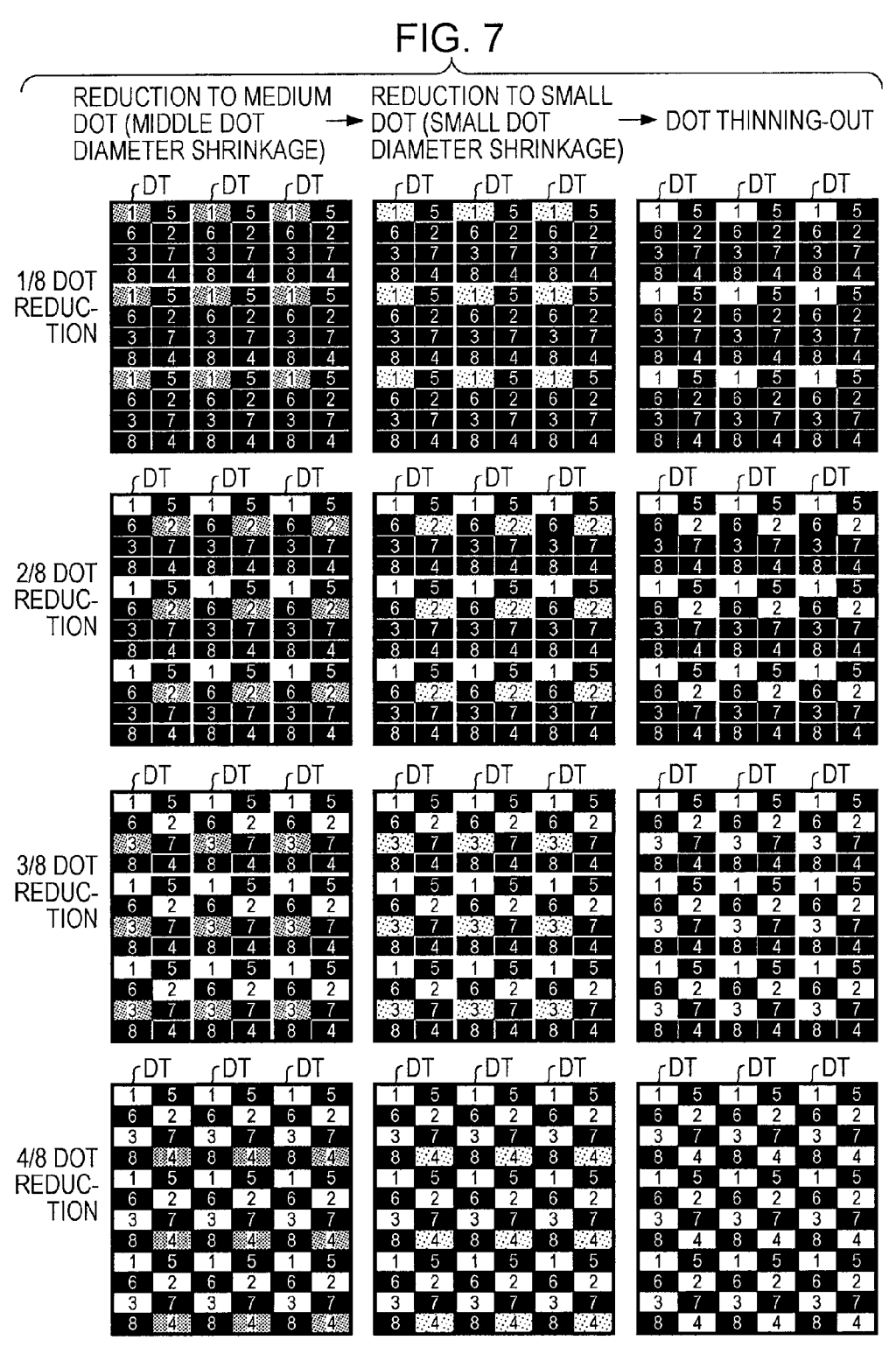
Figure 8:
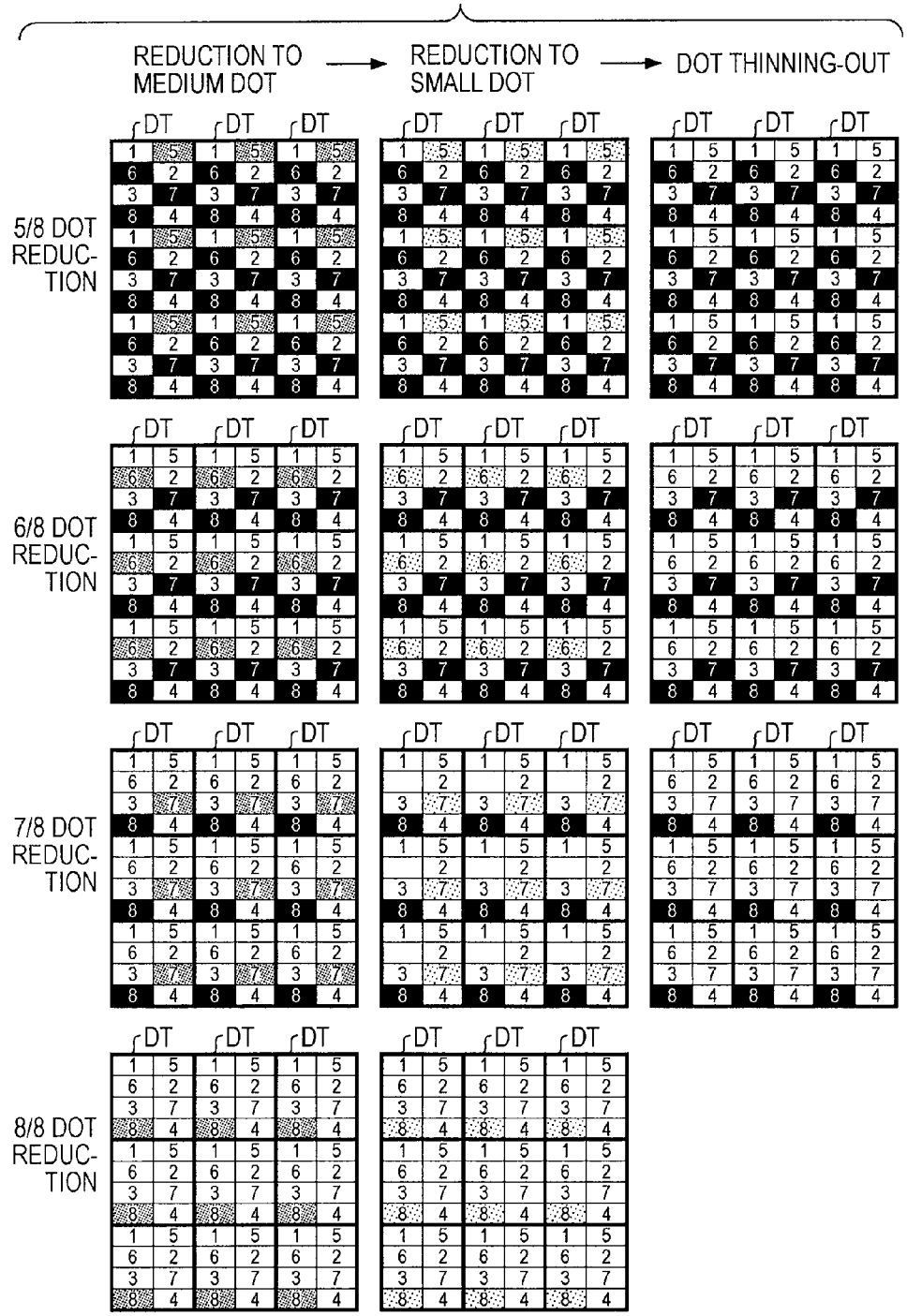
FIG. 8 is a diagram illustrating a thinning-out processing when a dot reduction degree exceeds 50%.

FIG. 6 is a diagram illustrating a no thinning-out state where the thinning-out processing is not performed according to this embodiment, and FIG. 7 is a diagram illustrating a thinning-out processing when a dot reduction degree is equal to or less than 50% in the thinning-out processing according to this embodiment. FIG. 8 is a diagram illustrating a thinning-out processing when a dot reduction degree exceeds 50%, and FIG. 9 is a diagram illustrating the difference between a thinning-out in a comparative example when the dot reduction degree is 50% and the thinning-out in this embodiment. As shown in FIG. 6, when the thinning-out processing is not performed, the ink dots using the large dot in FIG. 3 are output in the order of the pass numbers in the figure for each of the dot recording regions DT, and thereby the state where the dot recording using the large dot is completed for all the dots is shown in black. In contrast, FIGS. 7 and 8 show the states where the dot recording is performed by the thinning-out processing according to this embodiment, and this thinning-out processing has the following characteristics.

The dot recording state (recording position and order), which includes thinning-out with regard to one or more dots among the dots of 4×2 (eight), is assumed to be set in the dot recording region DT, and when the dot recording state is set for two or more dots in the dot recording region DT, the dot recording state is set for dots having a consecutive dot recording order (pass number). In addition, the setting of the dot recording state includes the thinning-out, and therefore, the setting of the dot recording state or the processing for this is also briefly referred to as a thinning-out or a thinning-out processing in the following description.

Since the setting of the dot recording state is made by these characteristics, as to adjacent main scanning lines in the sub-scanning direction in the dot recording region DT, main scanning lines of which pass numbers for the main scanning passes indicating the dot recording order are adjacent to each other, and thereby it is possible to reduce a sub-scanning shift error during the main scanning pass which performs the dot recording for the adjacent main scanning lines. In other words, a shift error typically occurs each time the sub-scanning shifts, and thereby dots aside from targets which are thinned out dots undergoing the dot recording, that is, dots undergoing the dot recording are spaced from each other since the pass numbers for the main scanning passes are spaced from each other, and thereby a sub-scanning shift error is accumulated as much as the number of spaced main scanning passes. Therefore, the pass numbers undergoing the dot recording in the main scanning pass are consecutive between the adjacent main scanning lines in the sub-scanning direction in the dot recording region DT so as to reduce the above-described error, and thus it is possible to reduce the sub-scanning shift error between the main scanning lines. As a result, accumulation in the difference between landing positions of the inks in the adjacent main scanning lines in the dot recording region DT is reduced and thus it is possible to reduce image quality deterioration resulting therefrom.

In addition, since the setting of the dot recording state is made by these characteristics, when the degree of the thinning-out is equal to or less than 4/8, as shown in FIG. 7, all the dots of one column or entire one row are not thinned out. However, as shown by the thinning-out in the comparative example (4/8 thinning-out) in FIG. 9, when the entire column is thinned out, the column stands out as being discolored, and this causes excessive image quality deterioration. This is the same for a case where the entire row (main scanning line) is thinned out. In this embodiment, as described above, when the thinning-out degree is equal to or less than 4/8, all the dots of one column or one row are not thinned out, and thus it is possible to suppress image quality deterioration. In addition, the thinning-out in the comparative example (4/8 thinning-out) in FIG. 9 is an example where the dots of even numbered columns (even numbered pixel positions on the main scanning line) in FIG. 4 are thinned out, and the thinning-out method in this comparative example is an example of the simplest thinning-out processing.

The thinning-out processing in the first embodiment is studied for prevention of excessive image quality deterioration in the overlap printing. In this meaning, the above-described thinning-out processing is also referred to as a "dot thinning-out considering overlapping." In this embodiment where the dot recording region DT is constituted by the dots of four rows by two columns, the thinning-out considering overlapping is possible in the states shown in FIGS. 7 and 8.

In this embodiment, since the dot recording region DT is formed as four rows by two columns after employing the diameter shrinkage of the dot size corresponding to the dot reduction, the dot recording state can be set for the dots of the number of dots from one to eight, and, in the 1/8 dot reduction in FIG. 7, the state of one dot thinning-out is shown in the left and right in the figure. In this one dot thinning-out, in the main scanning pass of the earliest pass number (the pass number 1) in the dot recording region DT, the thinning-out is performed for dots placed in the associated main scanning pass.

As described in FIG. 3, in this embodiment, the dot recording of the changing target dot is made by the medium size diameter shrinkage, the small size diameter shrinkage and the thinning-out, and thus the dot recording state in the 1/8 dot reduction in FIG. 7 is given as follows according to a dot reduction degree. In other words, although the number of dots taking up the dot recording region DT corresponds to the 1/8 dot reduction, the dot recording state in the main scanning pass with the pass number 1 is, first of all, designated as dot recording by the small size diameter shrinkage. In the figure, the dots placed in the main scanning pass with the pass number 1 are shown by a slightly lighter background color. In this dot recording state, the dot reduction degree is the minimum and is defined as the medium size diameter shrinkage in which the large dot is changed into the medium dot. If the dot reduction degree is to be increased more than this, the dot recording state in the main scanning pass with the pass number 1 is defined as dot recording by the small size diameter shrinkage. In the figure, the dots placed in the main scanning pass with the pass number 1 are shown by a lighter background color. If the dot reduction degree is to be increased much more, the dot recording in the main scanning pass with the pass number 1 is thinned out. In the figure, the dots placed in the main scanning pass with the pass number 1 are shown discolored. As above, in this embodiment, although the number of dots taking up the dot recording region DT corresponds to the 1/8 dot reduction, the dot recording state can be set at three steps.

If the number of dots thinned out from the dot recording region DT is two, it corresponds to the 2/8 dot reduction in FIG. 7, and the state of two dots thinning-out is shown in the left and the right in the figure. In this two dot thinning-out, the dot recording is thinned out in the main scanning pass with the pass number 1 in the 1/8 dot reduction, and then the dot recording in the main scanning pass with the pass number 2 subsequent to this pass number is changed in the order of the medium size diameter shrinkage, the small size diameter shrinkage and the thinning-out according to the increase of the dot reduction degree, as described above. The cases where the number of dots thinned out from the dot recording region DT is increased up to three to seven are also the same, and thus the dot recording is thinned out in the main scanning pass with the pass number up until prior to an increase of the number of dots thinned out and thereafter is changed in the order of the medium size diameter shrinkage, the small size diameter shrinkage and the thinning-out in the main scanning pass of a new pass number according to an increase of the dot reduction degree. If the number of dots thinned out from the dot recording region DT is eight which is an upper limit, the dot recording is changed in the order of the medium size diameter shrinkage and the small size diameter shrinkage in the main scanning pass of a new pass number according to an increase of the dot reduction degree. These are shown as the dot recording states in the 3/8 to 4/8 dot reductions in FIG. 7 and the dot recording states in the 5/8 to 8/8 dot reductions in FIG. 8.

As shown in FIGS. 7 to 8, in the respective thinning-out shapes where the number of thinned out dots is sequentially increased from one to eight (1/8 dot reduction ratio to 8/8 dot reduction ratio), the dot recording order (the pass number) of the thinning-out target dots (in detail, the changing target dots in the dot recording state) is consecutive as many times as the number of thinned out dots. From the shape of the dot recording state in the 2/8 dot reduction in FIG. 7 to the shape of the dot recording state in the 7/8 dot reduction in FIG. 8, under the environment where the dots are not thinned out through the lines in the sub-scanning direction, the dots which are not thinned out and the dots of which the size is reduced are recorded by landing of ink in the arrangement order of the pass numbers in the adjacent main scanning passes in the sub-scanning direction for each dot recording region DT. In addition, as for the dots considered as the dot recording state of the medium size diameter shrinkage and the small size diameter shrinkage, their sizes are changed from the large dot to the medium dot or the small dot; however, they are recorded by landing of ink in the arrangement order of the pass numbers in the adjacent main scanning passes in the sub-scanning direction for each dot recording region DT. For this reason, as described above, it is possible to further reliably reduce the accumulation in the difference of the landing position of the ink in the adjacent main scanning lines in the sub-scanning direction for the dot recording region DT, and thereby effectiveness of suppressing image quality deterioration can be further improved.

In this embodiment, since the above-described setting of the dot recording state and the thinning-out according to the pass number order in the dot recording region DT are performed, the thinned out dots are not arranged in a line, even in the thinning-out degree (4/8 dot reduction: thinning-out) like the comparative example (refer to FIG. 9) where the even numbered columns are thinned out collectively and also in the thinning-out degree (5/8 to 7/8 dot reduction: small size diameter shrinkage) greater than this comparative example. Therefore, in this embodiment, the thinned out dots are not arranged in the column in the sub-scanning direction and are not thus discolored up to an extremely high dot reduction degree, and thereby excessive image quality deterioration can be reliably suppressed even with a high dot reduction degree.

In addition, in this embodiment, since the above described dot recording state is determined in the dot recording region DT, the medium size diameter shrinkage, the small size diameter shrinkage and the thinning-out are carried out in the dot reduction, and thereby it is possible to finely reduce color material in multiple steps as well as improving the suppression of image quality deterioration.

Since the thinning-out of dots from the dot recording region DT is performed, the earliest pass number (the pass number 1 in FIG. 7) in the dot recording region DT is designated as the initial thinning-out target pass number and the thinning-out for only this pass number (1/8 dot reduction) is performed, and further the thinning-out for the pass numbers 1 to 2, the thinning-out for the pass numbers 1 to 3, the thinning-out for the pass numbers 1 to 4, the thinning-out for the pass numbers 1 to 5, the thinning-out for the pass numbers 1 to 6, the thinning-out for the pass numbers 1 to 7, and the thinning-out for the pass numbers 1 to 8 (2/8 to 8/8 dot reduction ratios) are performed in FIGS. 7 and 8. As above, the reason why the earliest pass number is designated as the initial thinning-out target pass number is that the dot recording order in the dot recording region DT designates the initial dot as a thinning-out target dot. Also, this is for easily handling the case where the number of setting target dots of the dot recording state is the maximum of eight (the medium size diameter shrinkage and the small size diameter shrinkage in case of eight) in the dot recording region DT of four rows by two columns. In other words, when the number of setting target dots of the dot recording state is determined, the setting target dots are easily determined one by one from the initial dot in the dot recording order in the dot recording region DT. A case where the initial setting target dot is made last in the dot recording order in the dot recording region DT is also the same, and in this case, the thinning-out target dots are easily determined one by one from this last dot.

If the number of setting target dots of the dot recording state is equal to or less than 7, the initial thinning-out target pass number may be the pass number other than the earliest pass number. For example, when the number of setting target dots of the dot recording state is 7, the thinning-out (the setting of the dot recording state) in the 1/8 dot reduction which is an initial thinning-out is performed for the dot with the pass number 1 or the pass number 2, and the pass numbers are made consecutive from this pass number until the number of setting target dots is 7. If the number of setting target dots is 6, the thinning-out (the setting of the dot recording state) in the 1/8 dot reduction which is an initial thinning-out is performed for some dots with the pass number 1 to the pass number 3, and the pass numbers are made consecutive from this pass number until the number of setting target dots is 6. That is to say, it is possible to set the pass number of a dot for performing the setting of the dot recording state in case of the thinning-out of one dot (the setting of the dot recording state), and when the number of setting target dots of the dot recording state is increased, it is possible to set an initial thinning-out target pass number in a scope of consecutive pass numbers up to the number of setting target dots.

Also, a pass number of a setting target dot of the dot recording state can be set as follows. A ring-shaped pass number line where the pass numbers are arranged in a loop form from the earliest pass number (the pass number 1 in FIG. 7) to the last pass number (the pass number 8 in FIG. 7) in the dot recording region DT is assumed, and an initial thinning-out target pass number is arbitrarily set. Thereafter, an arrangement from the arbitrarily set pass number to a pass number consecutive up to the number of setting target dots in the ring-shaped pass number line can be designated as an arrangement of pass numbers for setting target dots of the dot recording state. For example, if the number of setting target dots is 4, when an initial thinning-out target pass number is set to 6, the arrangement from this pass number 6 to a pass number consecutive up to the number of setting target dots 4 in the ring-shaped pass number line, that is, the arrangement of the pass number 6→the pass number 7→ the pass number 8→ the pass number 1 is designated as an arrangement of the pass numbers for the setting target dots of the dot recording state.

Figure 10:
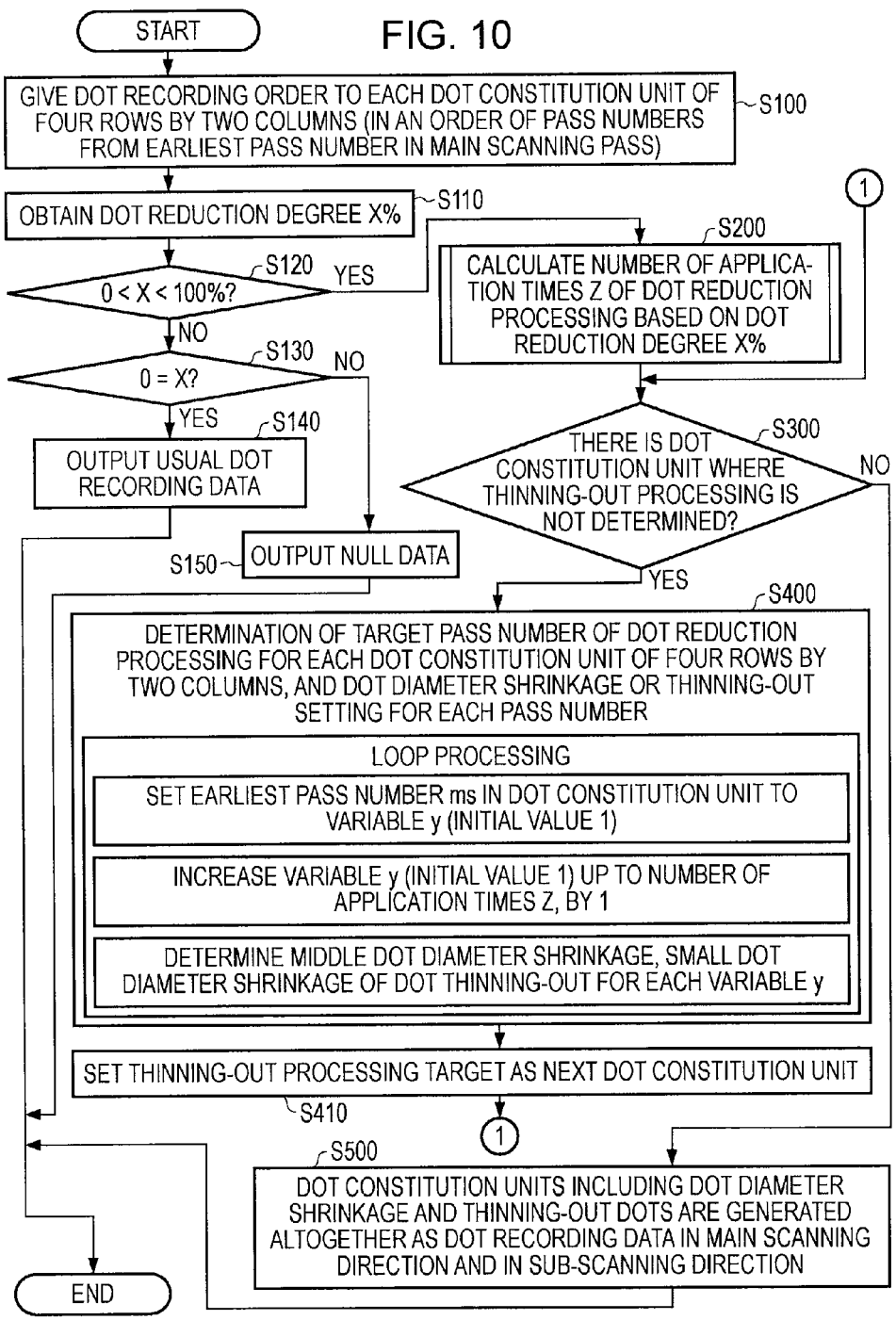
FIG. 10 is a flowchart illustrating a method of determination of thinning-out processing target dots for each dot recording region DT and generation of dot recording data after the determination.

A processing for achieving the thinning-out shown in FIGS. 7 and 8 will now be described. FIG. 10 is a flowchart illustrating a method of determination of thinning-out processing target dots for each dot recording region DT and generation of dot recording data after the determination. This processing is executed by the thinning-out processing section 25 (FIG. 1). At step S100, a dot recording order setting is performed for dots in the main scanning direction and the sub-scanning direction with respect to image data, which is a printing target, output to the printer driver 20 for each dot recording region DT of four rows by two columns. The dot recording order at this time is set so that the recording order is increased obliquely in the arrangement of four rows by two columns from the earliest pass number with respect to the pass numbers for the main scanning passes corresponding to the dots contained in each dot recording region DT, as described in FIGS. 5 to 8. In this case, a hardware configuration (refer to FIG. 2) of each nozzle line 250n of the head unit 250 is determined in advance and thus a dot configuration of the associated image data is confirmed when the image data as the printing target is output to the printer driver 20. Therefore, based on the confirmed dot configuration, the dot recording order setting is made for each dot recording region DT in advance and the setting result may be read at step S100.

At next step S110, the dot reduction degree (X %) is obtained for each dot recording region DT from the dot reduction degree input section 140. As described above, the dot reduction degree input section 140 receives input from a user and, in this embodiment, the dot reduction degree (X %) in a range of 0% to 100% is obtained by the input operation. Subsequent to the obtainment of the dot reduction degree (X %), it is determined whether or not the dot reduction degree (X %) lies in 0<x<100 (step S120) and whether or not the dot reduction degree (X %) is 0% (step S130). If the dot reduction degree (X %) is 0% or 100%, the former means the dot reduction is of no use and the latter means the dot recording is not performed, and thus the processing described later is not necessary. Therefore, if the determination at step S120 is negative and further the determination at step S130 is affirmative, the obtained dot reduction degree (X %) is 0%. For this reason, based on the printing data, generation of dot recording data is output as usual without performing the dot reduction (step S140), and this routine is completed. In contrast, if the determination is negative at step S130, the obtained dot reduction degree (X %) is 100%, and thus this routine is completed by outputting null data so that the dot recording is not performed at all (step S150).

Figure 11:
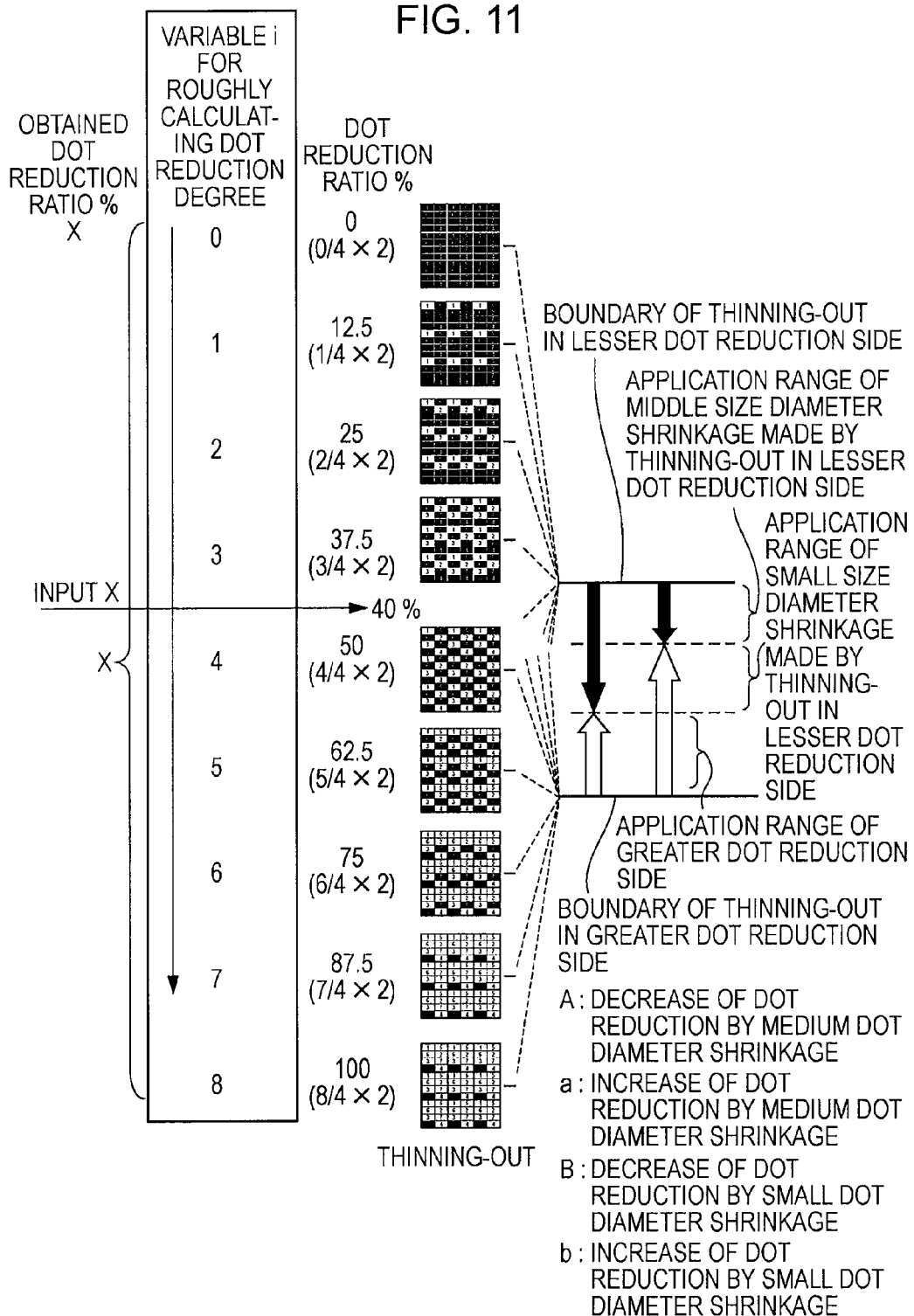
FIG. 11 is a diagram illustrating an outline of the calculation processing for the number of application times Z of the dot reduction processing.

At step S200 subsequent to the affirmative determination at step S120 described above, the number of application times Z of the dot reduction processing in the generation of dot recording data is calculated. First, the outline of the contents of this calculation processing for the number of application times Z of the dot reduction processing will be described. FIG. 11 is a diagram illustrating an outline of the calculation processing for the number of application times Z of the dot reduction processing. FIG. 11 shows a relation between an application range of the medium dot diameter shrinkage and an application range of the small dot diameter shrinkage, and an application range from the obtained dot reduction ratio X (step S110) in a consecutive thinning-out, after associating a virtual 8/8 thinning-out where no dot recording is performed in addition to the 1/8 dot reduction (thinning-out) to the 7/8 dot reduction (thinning-out) shown in FIGS. 7 and 8, with the dot reduction ratio. Hereinafter, this will be described in detail.

If the obtained dot reduction ratio X matches the dot reduction ratio shown in FIG. 11, for example, if the obtained dot reduction ratio X is 12.5% or 25% or the like, the dot reduction corresponding to the obtained dot reduction ratio X is immediately determined as the 1/8 dot reduction (thinning-out) and the 2/8 dot reduction (thinning-out). However, the obtained dot reduction ratio X (for example, 40% in the figure) is sometimes included in a reduction ratio range corresponding to this thinning-out. In this case, the obtained dot reduction ratio X (=40%) lies between the 4/8 dot reduction (thinning-out) corresponding to the dot reduction ratio 50% and the 3/8 dot reduction (thinning-out) corresponding to the dot reduction ratio 37.5%, and thus the 4/8 dot reduction (thinning-out) and the 3/8 dot reduction (thinning-out) are boundaries for determining a dot reduction corresponding to the obtained dot reduction ratio X (=40%). In this case, the 4/8 dot reduction (thinning-out) becomes a thinning-out boundary in a greater dot reduction side and the 3/8 dot reduction (thinning-out) becomes a thinning-out boundary in a lesser dot reduction side. This is shown in the enlarged view of FIG. 11.

If seen from the 3/8 dot reduction (thinning-out) which is the thinning-out boundary in a lesser dot reduction side, the obtained dot reduction ratio X of 40% is placed in the 4/8 dot reduction (thinning-out) side which is the thinning-out boundary in a greater dot reduction side. An increase of the dot reduction ratio from the 3/8 dot reduction (thinning-out: dot reduction ratio 37.5%) to the 4/8 dot reduction (thinning-out:dot reduction ratio 50%) is caused by performing 3/8 dot reduction (thinning-out) and 4/8 dot reduction (medium dot diameter shrinkage) subsequent thereto, and then performing 4/8 dot reduction (small dot diameter shrinkage). Therefore, depending on a degree of the increase of the dot reduction ratio by the medium dot diameter shrinkage and a degree of the increase of the dot reduction ratio by the small dot diameter shrinkage, it is confirmed whether the obtained dot reduction ratio X of 40% is placed between the 3/8 dot reduction (thinning-out) which is the thinning-out boundary in a dot little-reduction side and the 4/8 dot reduction (medium dot diameter shrinkage) or between the 4/8 dot reduction (medium dot diameter shrinkage) and the 4/8 dot reduction (small dot diameter shrinkage).

On the contrary, if seen from the 4/8 dot reduction (thinning-out) side which is the thinning-out boundary in a greater dot reduction side, the obtained dot reduction ratio X of 40% is placed in the 3/8 dot reduction (thinning-out) which is the thinning-out boundary in a lesser dot reduction side. A reduction in the dot reduction ratio from the 4/8 dot reduction (thinning-out:the dot reduction ratio 50%) to the 3/8 dot reduction (thinning-out:the dot reduction ratio 37.5%) is caused by 4/8 dot reduction (small dot diameter shrinkage) prior to 4/8 dot reduction (thinning-out), or 4/8 dot reduction (medium dot diameter shrinkage) prior thereto. Therefore, it is confirmed whether the obtained dot reduction ratio X is placed between the 4/8 dot reduction (thinning-out) which is the thinning-out boundary in a greater dot reduction side and the 4/8 dot reduction (small dot diameter shrinkage) or placed between the 4/8 dot reduction (small dot diameter shrinkage) and the 4/8 dot reduction (medium dot diameter shrinkage) depending on the difference between the degree of the increase of the dot reduction ratio by the above-described medium dot diameter shrinkage and small dot diameter shrinkage, and the degree of the dot reduction between the upper boundary and the lower boundary. In this embodiment, a dot reduction state corresponding to the obtained dot reduction ratio X is set based on the latter mechanism.

Figure 12:
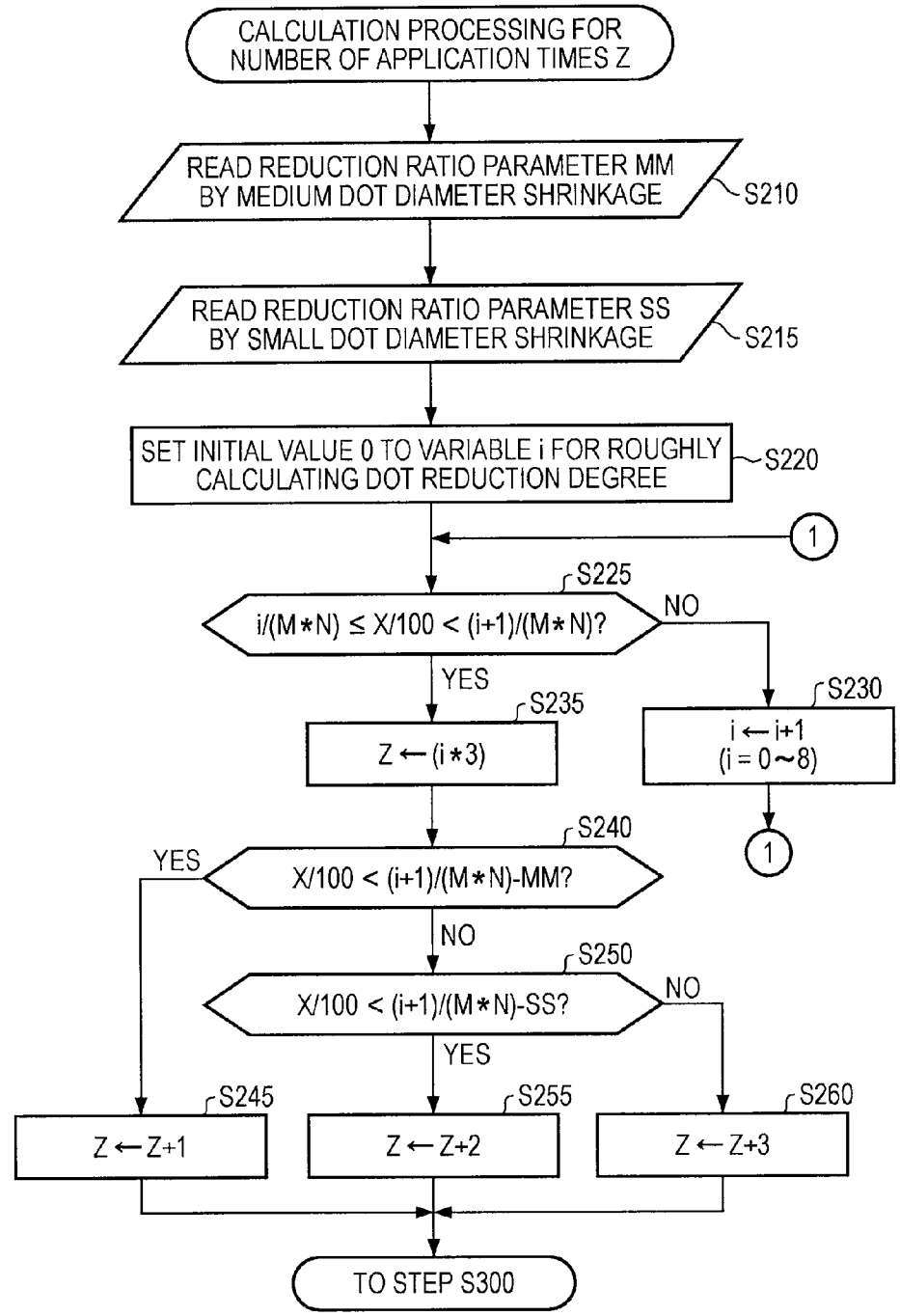
FIG. 12 is a flowchart illustrating the calculation processing for the number of application times Z of the dot reduction processing in detail.

FIG. 12 is a flowchart illustrating in detail the calculation processing for the number of application times Z of the dot reduction processing. In this calculation processing for the number of application times, first, a reduction ratio influence parameter MM by the medium dot diameter shrinkage is read (step S210) and a reduction ratio influence parameter SS by the small dot diameter shrinkage is read (step S215). In other words, as described in the enlarged view of FIG. 11, the medium dot diameter shrinkage and the small dot diameter shrinkage have been made using the difference from the thinning-out boundary in a lesser dot reduction side and thus make a contribution to the calculation of the obtained dot reduction ratio X. If assuming the obtained dot reduction ratio X as 40% for description, the difference from the 4/8 dot reduction (thinning-out) which is the thinning-out boundary in a greater dot reduction side has influence on the determination of this obtained dot reduction ratio X as 40%. Thereby, the above-described reduction ratio influence parameters MM and SS are read. The reduction ratio influence parameter MM results from the change of the dot recording from the large dot size to the medium dot size. Thus, with respect to the dot recording region DT of M rows by N columns (four rows by two columns in this embodiment), based on a dot weight WLA when all the dots undergo dot recording in the large dot size, and a weight WM of one dot in the medium dot size, the reduction ratio influence parameter MM accompanied by the medium dot diameter shrinkage is defined as follows.

MM=f(WM/WLA), where WLA is a weight obtained by multiplying a weight WL of one dot in the large dot size by M*N. The reduction ratio influence parameter MM is obtained by a function which takes the dot weight ratio WM/WLA as a variable, and thus this function converts the dot weight ratio into the dot reduction ratio and then calculates a value corresponding to the above-described difference accompanied by the medium dot diameter shrinkage.

Likewise, the reduction ratio influence parameter SS accompanied by the small dot diameter shrinkage is also calculated based on the above-described dot weight WLA and a weight WS of one dot in the small dot size.

SS=f(WS/WLA), where reduction ratio influence parameter SS is obtained by a function which takes the dot weight ratio WS/WLA as a variable, and thus this function converts the dot weight ratio into the dot reduction ratio and then calculates a value corresponding to the above-described difference accompanied by the small dot diameter shrinkage.

In addition, as described above, when the obtained dot reduction ratio X is calculated using the increase in the dot reduction ratio degree from the thinning-out boundary in a lesser dot reduction side, the function takes the dot weight ratio which is a parameter as a variable, and thus it is good to use the function for calculating the medium dot diameter shrinkage and the above-described increase in the reduction ratio degree accompanied by the medium dot diameter shrinkage.

Following the above-described reading of the parameters, a variable i for roughly calculating the dot reduction degree is set to an initial value 0 (step S220). This variable i matches the dot reduction ratios corresponding to the 1/8 to 8/8 thinning-out in FIG. 11 and thus is for calculating a thinning-out in the thinning-out boundary in a lesser dot reduction side and the thinning-out boundary in a greater dot reduction side when calculating the obtained dot reduction ratio X. Subsequent to the initial value setting, while the variable i is increased by 1, the thinning-out situation in the thinning-out boundary is found out from the inequality at step 225 when calculating the obtained dot reduction ratio X. Hereinafter, this will be described while changing the variable i under the assumption of the obtained dot reduction ratio X as 40%.

Since, from the inequality at step S225, M*N corresponds to 4*2=8 in this embodiment, the left-hand side is a dot reduction ratio (refer to FIG. 11) corresponding to i/8 thinning-out of 1/8 to 8/8 thinning-out. The right-hand side is a dot reduction ratio (refer to FIG. 11) corresponding to (i+1)/8 of 1/8 to 8/8 thinning-out and indicates a reduction ratio in a thinning-out higher than i/8 thinning-out shown in the left-hand side by one step. That is to say, the inequality at step S225 means that thinning-out states of both of the obtained dot reduction ratio X (the thinning-out in a greater dot reduction side and the thinning-out in a lesser dot reduction side with respect to the obtained dot reduction ratio X) while changing the variable i. Since i=0 following the initial value setting to the variable i, the determination is negative at step S225 and thereby the variable i becomes 1 at step S230. The inequality is operated using i=1 again at step S225, and in this case, the obtained dot reduction ratio X which has been assumed to be input is 40%, and the negative determination is thereby made again at step S225. If the operation is made while changing the variable i, the determination is affirmative in the variable i=3 at step S225 when the obtained dot reduction ratio X is 40%. At next step S235, the number of application times Z of the dot reduction processing is set to a numerical value three times greater than the variable i(=3) (Z=9). The reason why the variable i is made to be three times larger is that, if a progress is to be made from a dot reduction in a certain state, for example, 3/8 dot reduction to 2/8 dot reduction which progresses further than this in the dot reduction, a dot reduction state development of three times including the medium dot diameter shrinkage, the small dot diameter shrinkage and the thinning-out is required.

At step S240 subsequent to the setting of the number of application times Z of the dot reduction processing (Z=9), the obtained dot reduction ratio X is compared with a dot reduction ratio in the thinning-out state in a greater dot reduction side which is greater than this. When the obtained dot reduction ratio X is 40%, since the variable i is 3 as described above, the obtained dot reduction ratio X is compared with the right-hand side obtained by subtracting the reduction ratio influence parameter MM accompanied by the medium dot diameter shrinkage from the dot reduction ratio corresponding to (i(=3)+1)/8, that is, 4/8 dot thinning-out. If an affirmative determination is made here, since the obtained dot reduction ratio X=40% is contained in the application range of the medium size diameter shrinkage which is greater than the thinning-out in a lesser dot reduction side in the reduction degree in the enlarged view of FIG. 11, 1 is added to the number of application times Z (=9) of the dot reduction processing at step S245 so as to find out the number of application times Z of the dot reduction processing (Z=10).

At step S250 subsequent to the negative determination at step S240, the comparison of the obtained dot reduction ratio X with the dot reduction ratio in the thinning-out state in a greater dot reduction side which is greater than this is made in association with the small dot diameter shrinkage. That is to say, when the obtained dot reduction ratio X is 40%, the obtained dot reduction ratio X is compared with the right-hand side obtained by subtracting the reduction ratio influence parameter SS accompanied by the small dot diameter shrinkage from the dot reduction ratio corresponding to the 4/8 dot thinning-out. If an affirmative determination is made here, since the obtained dot reduction ratio X=40% is contained in the application range of the small size diameter shrinkage which is greater than the thinning-out in a lesser dot reduction side in the reduction degree in the enlarged view of FIG. 11, 2 is added to the number of application times Z (=9) of the dot reduction processing at step S255 so as to find out the number of application times Z of the dot reduction processing (Z=11).

If a negative determination is made at step S250, since the obtained dot reduction ratio X=40% is contained in the application range of the thinning-out in the greater dot reduction side in the enlarged view of FIG. 11, 3 is added to the number of application times Z (=9) of the dot reduction processing at step S260 so as to find out the number of application times Z of the dot reduction processing (Z=12).

However, the above-described determinations at steps S240 and S250 are influenced by the magnitudes of the reduction ratio influence parameters MM and SS, and the determinations at both steps corresponding to the obtained dot reduction ratio X, for example, 40% necessarily enables the flow to go to any one step. Therefore, with respect to the obtained dot reduction ratio X, a number of application times Z is necessarily determined at step S245, step S255 or step S260.

This calculation of the number of application times Z of the dot reduction ratio will be described with reference to FIG. 7. The number of application times Z=9 calculated at step S235 is a number of times where a dot reduction progresses up to the dot reduction ratio corresponding to the 3/8 dot reduction (thinning-out) which is a thinning-out in a lesser dot reduction side at the obtained dot reduction ratio X=40%. In other words, it means that, up to the 3/8 dot reduction (thinning-out) in FIG. 7, that is, from 1/8 to 3/8 dot reduction (thinning-out), the medium dot diameter shrinkage, the small dot diameter shrinkage and the thinning-out are carried out three times from 1/8 to 3/8. Thus, a dot reduction state matching the obtained dot reduction ratio X=40% greater than the dot reduction ratio corresponding to the thinning-out in a lesser dot reduction side (3/8 dot reduction: thinning-out) is determined by adding the influence by the reduction ratio influence parameters MM and SS, based on the number of application times Z=9 calculated at step S235. The flow goes to step S300 in FIG. 10, following the calculation of the number of application times Z of the dot reduction processing which is performed in this way.

At step S300 in FIG. 10, it is determined whether or not the dots thinned out by the thinning-out processing are placed in an undetermined dot recording region DT. If a negative determination is made here, a determination of thinned out dots and a dot recording order setting considering the determination in all the dot recording regions DT are completed, and thus the flow goes to step S500 and this routine is completed.

On the other hand, if an affirmative determination is made at step S300, in an undetermined dot recording region DT where the dots thinned out by the thinning-out processing are placed, for each dot recording region DT, target pass numbers for the dot reduction processing are determined, and the medium dot diameter shrinkage, the small dot diameter shrinkage or the thinning-out is set for each of the determined pass numbers (step S400). These series of the processings are a loop processing, and, first, the earliest pass number ms (ms=1 in FIGS. 7 and 8) is set to a variable y (an initial value of 1) in the dot recording region DT. In other words, as described above, since the earliest pass number ms in the dot recording region DT is changed in addition to the progress of the main scanning passes, the variable y (the initial value of 1) is used in order to handle the changing. A main scanning pass of a pass number corresponding to the variable y of the set initial value 1 is designated as an initial main scanning pass for performing a setting of the dot recording state, and a pass number for performing a setting of the last dot recording state is determined from this initial main scanning pass (the pass number corresponding to the variable y (=1)), based on the number of application times Z.

For example, if the number of application times Z is given as 10 by the processing for calculation of the number of application times in FIG. 12, a dot recording state corresponding to this number of application times Z=10 pertains to the 4/8 dot reduction (small size diameter shrinkage) in FIG. 7. Thereby, a pass number for performing the setting of the last dot recording state is set as 4, and thus the final value of the variable is designated as 4. In cases in FIGS. 7 and 8, the earliest pass number (=1) in the dot recording region DT is the same as the initial value 1 of the variable y. However, as described above, although the earliest pass number is changed in the dot recording region DT, if the number of application times Z is the same, the final value of the variable y is also the same, and thus the main scanning passes of the consecutive pass numbers corresponding to the variable y=1 to 4 are designated as target passes of dot recording states. Therefore, the medium dot diameter shrinkage, the small dot diameter shrinkage or the thinning-out is designated to be performed for the main scanning pass for each of the consecutive pass numbers corresponding to the variable y=1 to 4, and the dot recording state in the dot recording region DT is determined. Since the dot recording state corresponding to the number of application times Z=10 pertains to the 4/8 dot reduction (medium size diameter shrinkage) in FIG. 7, the dot recording state in the main scanning pass with the pass number 4 corresponding to the final value of the variable y=4 is set to a recording state of the medium dot diameter shrinkage, and dot recording states in the main scanning passes of the pass numbers prior thereto is set to a recording state of the thinning-out.

In this way, when the thinned out dots are determined for the respective dots in the recording state setting target pass numbers in the dot recording region DT, in response to the dot reduction degree (dot reduction ratio X) set by a user, the above-described processing targets are set for the subsequent dot recording region DT (step S410) so as to repeat the processing from step S300. If a negative determination is made at step S300, since the determination of the thinned out dots for all the dot recording regions DT and the dot recoding order setting considering this are completed, the dot recording region DT including the thinned out targets and the dots for which the determination is completed is designated as the dot recording data in accord with the main scanning direction and the sub-scanning direction (step S500), and then this routine is finished. As a result, the ink dot is performed based on the dot recording data including information for the thinned out dots and the dot recording order, thereby the thinning-out processing having the above-described characteristics as shown in FIGS. 7 and 8. Therefore, it is possible to reduce the amount of ink used without excessive image quality deterioration.

Also, as apparent from FIGS. 7 and 8, the dot recording regions DT including the same dot recording order and the same thinned out dots are arranged in the main scanning direction. Therefore, it is sufficient that the processings at steps S300 to S410 are performed along the sub-scanning direction with respect to the dot recording regions DT arranged in the sub-scanning direction from the earliest raster side, that is, the dot recording regions DT arranged in the sub-scanning direction in the left column in FIG. 5, and the determination of the thinning-out processing target dots with respect to the dot recording regions DT arranged in the sub-scanning direction can be processed in parallel. Thus, there can be a reduction in operation load needed for assembling the dot recording data at step S500 in addition to steps S300 to S410, and thereby it is possible to perform high speed processing.

In addition, the dot reduction ratio X can be set arbitrarily in the range of 0% to 100%, and the dot reduction is achieved in response to the set dot reduction ratio and thus it is possible to finely reduce color material.

C. MODIFIED EXAMPLES

The invention is not limited to the embodiments described above but is applicable to various aspects without departing from the subject matter, and, for example, the following modified examples are possible.

C1. Modified Example 1

Figure 13:
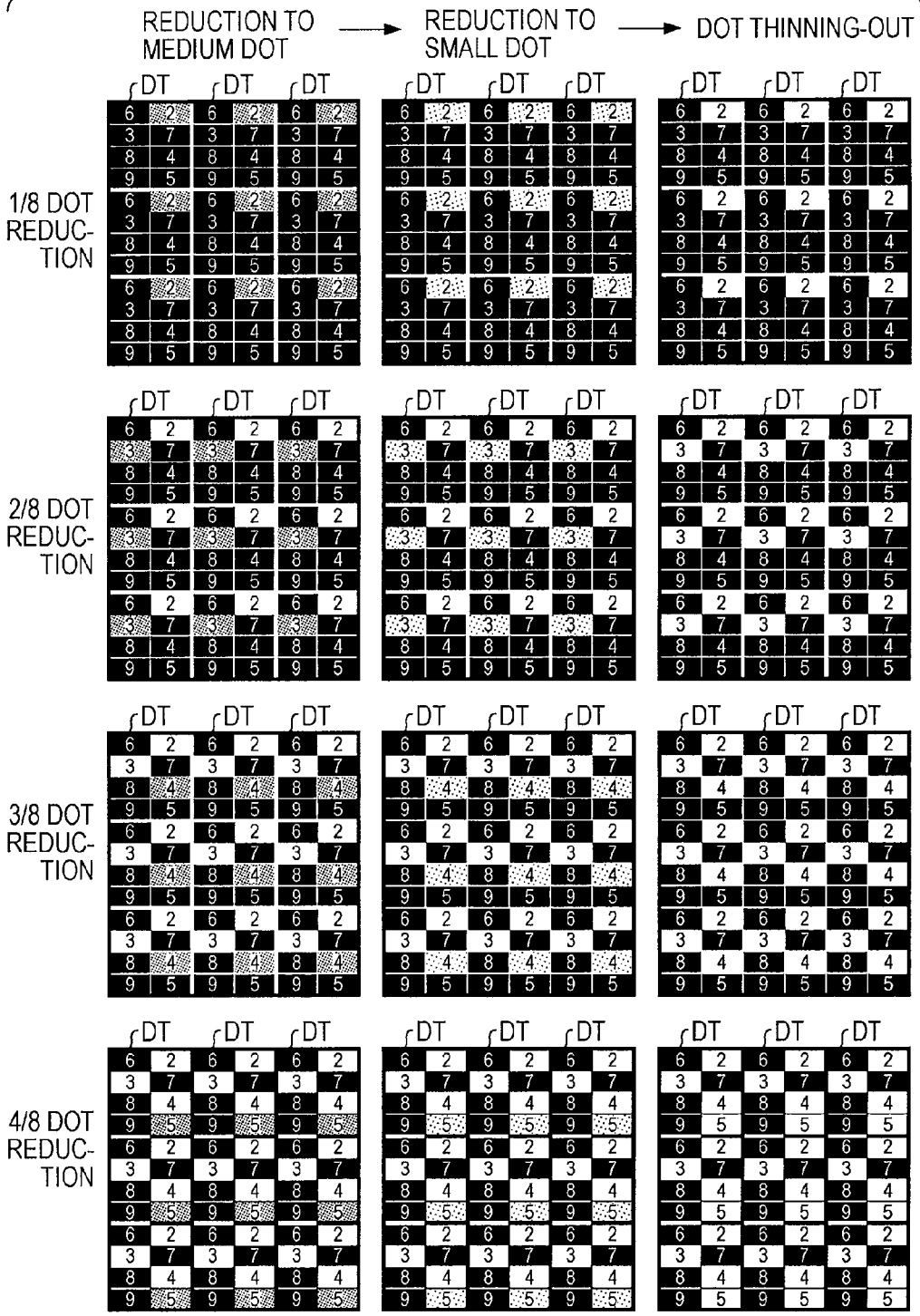
FIG. 13 corresponds to FIG. 7 and is a diagram illustrating a thinning-out processing when a dot reduction degree is equal to or less than 50% in the thinning-out processing according to a modified example 1.
Figure 14:
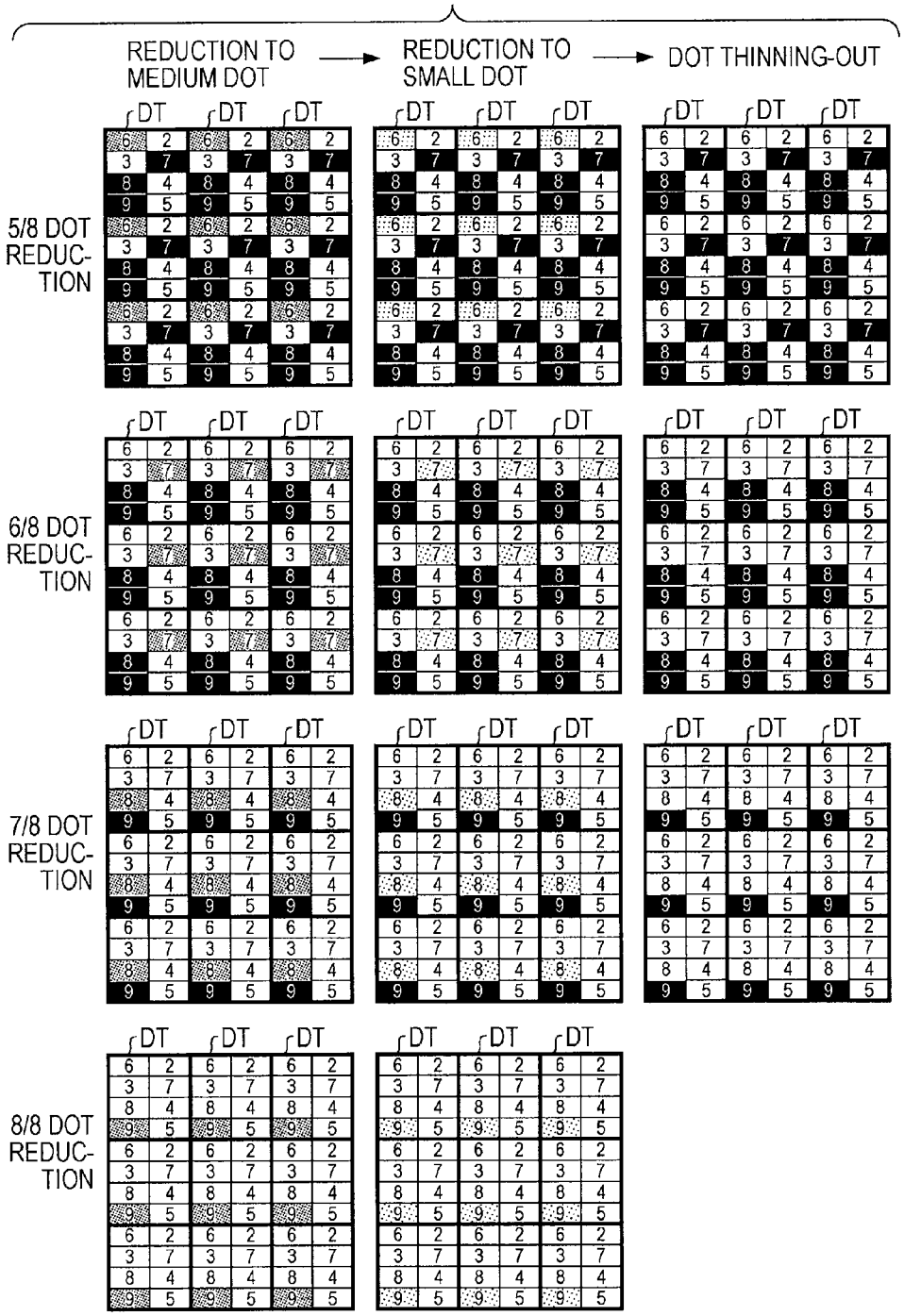
FIG. 14 corresponds to FIG. 8 and is a diagram illustrating a thinning-out processing when the dot reduction degree exceeds 50%.

In the dot recording region DT of four rows by two columns, the arrangement of the pass numbers for the main scanning passes and the dots corresponding to the pass number, that is, the arrangement of the dots in the dot recording order corresponding to the pass number order can be modified as follows, except for the case where the recording order is all increased obliquely in the arrangement of four rows by two columns as shown in FIGS. 7 and 8. FIG. 13 corresponds to FIG. 7 and is a diagram illustrating a thinning-out processing when the dot reduction degree is equal to or less than 50% in the thinning-out processing according to a modified example 1. FIG. 14 corresponds to FIG. 8 and is a diagram illustrating a thinning-out processing when the dot reduction degree exceeds 50%.

In the modified example 1 in FIGS. 13 to 14, with respect to the dot recording region DT of four rows by two columns, although the pass numbers corresponding to the dot recording order for each column in the sub-scanning direction are not consecutive through the entire column, they are consecutive through a portion of the column, that is, two rows, which is a half of four rows. In detail, in the dot recording region DT, the recording of the respective dots is completed in the main scanning passes eight times from the earliest pass number 2 to 9, the respective dots are recorded in the order of the pass numbers 2 to 9 so as to correspond to the pass numbers, the pass numbers (dot recording order) are increased obliquely in the development from 1 row to 2 row and in the development from 2 row to 3 row in the same manner as the embodiments described above; however, the pass numbers (dot recording order) are consecutive in the arrangement of the dots of 3 row by 1 column and 4 row by 1 column and in the arrangement of the dots of 3 row by 2 column and 4 row by 2 column. In this modified example 1 as well, as shown in FIGS. 13 and 14, the thinned out dots are arranged so as not to be in a line in the sub-scanning direction from the thinning-out of only the earliest pass number 2 (1/8 dot reduction: the medium size diameter shrinkage, the small size diameter shrinkage or the thinning-out) to the thinning-out of the pass numbers 2 to 7 (6/8 dot reduction: the medium size diameter shrinkage and the small size diameter shrinkage), and thereafter the dot recordings in the main scanning passes adjacent in the sub-scanning direction may be consecutive, and, in detail, the large dot recordings may be consecutive to each other, the large dot recording and the medium dot recording may be consecutive, and the large dot recording and the small dot recording may be consecutive. In the case of a thinning-out using a high thinning-out degree such as from the thinning-out of the pass numbers 2 to 7 (6/8 dot reduction: thinning-out) to the thinning-out of the pass numbers 2 to 9 (8/8 dot reduction: the medium size diameter shrinkage and the small size diameter shrinkage), the dot recordings in the two main scanning passes adjacent for the first time in the sub-scanning direction cannot be consecutive and the thinned out dots are merely arranged in a line in the sub-scanning direction. Therefore, also in this modified example 1, it is possible to suppress image quality deterioration and reduce the amount of ink used by using up to the high thinning-out degree, and further ink reduction may be prioritized using the high thinning-out degree.

C2. Modified Example 2

The arrangement of the dots in the dot recording region DT of four rows by two columns can be modified as follows. FIG.

Figure 16:
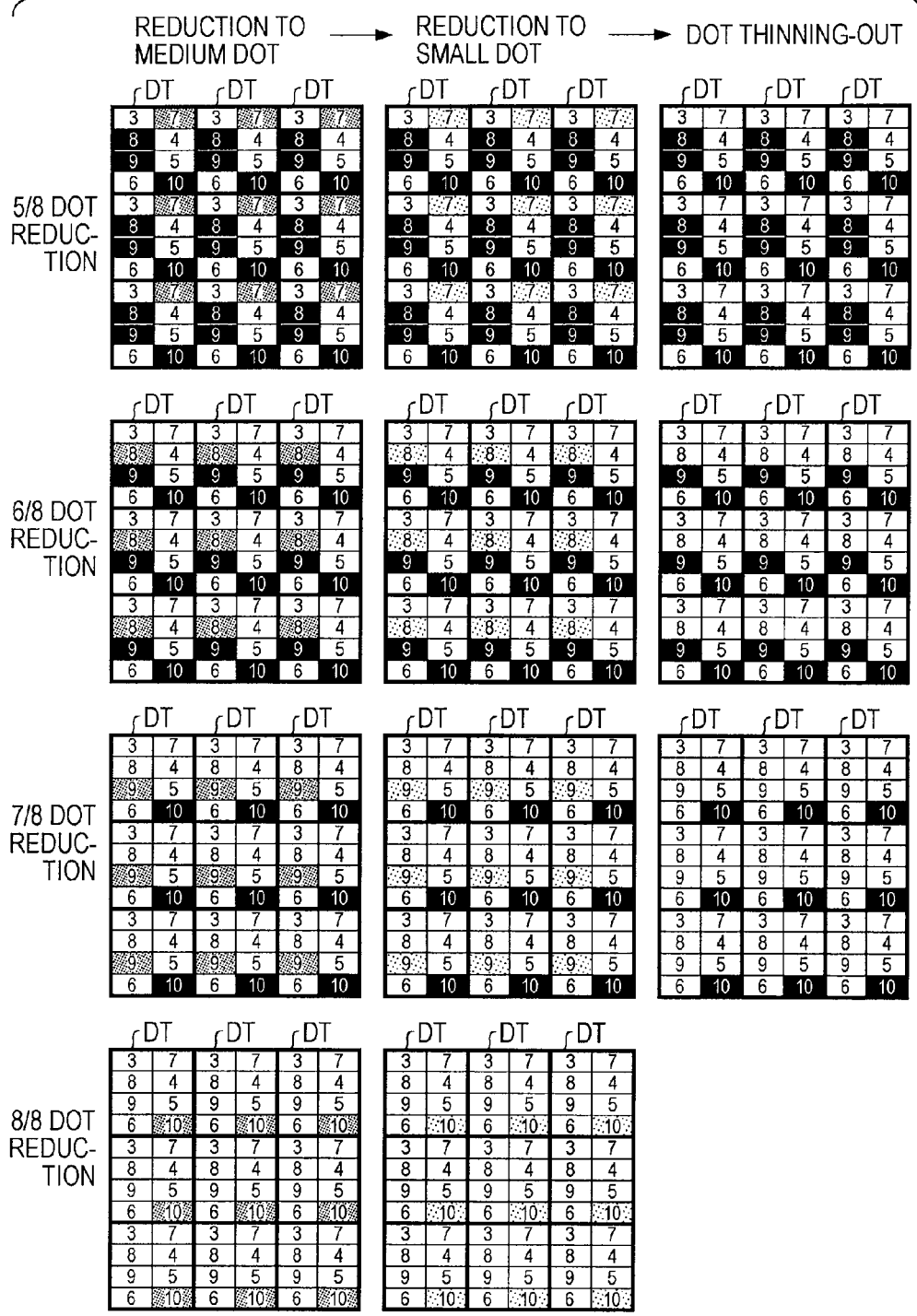
FIG. 16 corresponds to FIG. 14 and is a diagram illustrating a thinning-out processing when a dot reduction degree exceeds 50%.

15 corresponds to FIG. 13 and is a diagram illustrating a thinning-out processing when a dot reduction degree is equal to or less than 50% in the thinning-out processing according to the modified example 2. FIG. 16 corresponds to FIG. 14 and is a diagram illustrating a thinning-out processing when a dot reduction degree exceeds 50%.

Figure 15:
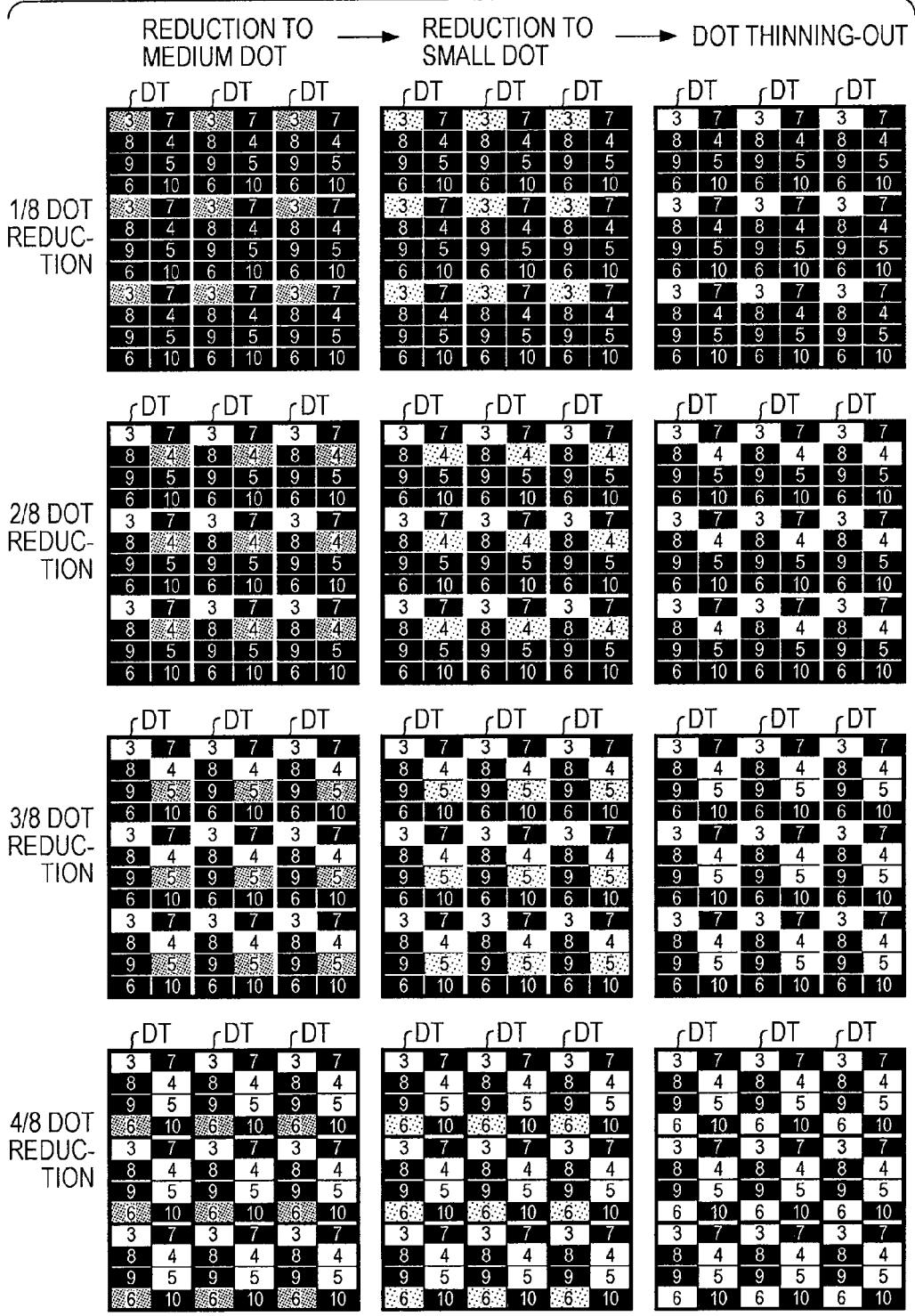
FIG. 15 corresponds to FIG. 13 and is a diagram illustrating a thinning-out processing when a dot reduction degree is equal to or less than 50% in the thinning-out processing according to the modified example 2.

In the modified example 2 in FIGS. 15 to 16, with respect to the dot recording region DT of four rows by two columns, although the pass numbers corresponding to the dot recording order for each column in the sub-scanning direction are not consecutive through the entire column, they are consecutive through two rows, which is a half of four rows, like the above-described modified example 1. In detail, in the dot recording region DT, the recording of the respective dots is completed in the main scanning passes eight times from the pass numbers 3 to 10, the respective dots are recorded in the order of the pass numbers 3 to 10 so as to correspond to the pass numbers, the pass numbers (dot recording order) are increased obliquely in the development from 1 row to 2 row and in the development from 3 row to 4 row in the same manner as the embodiments described above; however, the pass numbers (dot recording order) are consecutive in the arrangement of the dots of 2 row by 1 column and 3 row by 1 column and in the arrangement of the dots of 2 row by 2 column and 3 row by 2 column. In this modified example 2 as well, as shown in FIGS. 15 and 16, the thinned out dots are arranged so as not to be in a line in the sub-scanning direction from the thinning-out of only the earliest pass number 3 (1/8 dot reduction: the medium size diameter shrinkage, the small size diameter shrinkage or the thinning-out) to the thinning-out of the pass numbers 3 to 9 (7/8 dot reduction: the medium size diameter shrinkage and the small size diameter shrinkage), and thereafter the dot recordings in the main scanning passes adjacent in the sub-scanning direction may be consecutive, and, in detail, the large dot recordings may be consecutive to each other, the large dot recording and the medium dot recording may be consecutive, and the large dot recording and the small dot recording may be consecutive. In the case of a thinning-out of an extremely high thinning-out degree such as from the thinning-out of the pass numbers 3 to 9 (7/8 dot reduction: thinning-out) to the thinning-out of the pass numbers 3 to 10 (8/8 dot reduction: the medium size diameter shrinkage and the small size diameter shrinkage), the dot recordings in the two main scanning passes adjacent for the first time in the sub-scanning direction cannot be consecutive and the thinned out dots are merely arranged in a line in the sub-scanning direction. Therefore, also in this modified example 2, it is possible to suppress image quality deterioration and reduce the amount of ink used by using up to the extremely high thinning-out degree, and further ink reduction can be prioritized using the extremely high thinning-out degree.

C3. Modified Example 3

In addition to the above-described characteristics, the dot thinning-out processing considering overlapping has a characteristic that the thinning-out processing for each dot recording region DT can be performed differently in a case where the dot recording region DT is constituted by only large dots and in a case where it is constituted by medium dots or small dots. For example, in the case where the dot recording region DT is constituted by only large dots, the 1/8 to 7/8 thinning-out (dot reduction) in FIGS. 7 and 8 can be performed, and in the case where it is constituted by medium dots or small dots, the thinning-out degree is limited to the 1/8 to 4/8 dot reduction (the small size diameter shrinkage and/or the thinning-out) in FIG. 7.

When the respective dots of the dot recording region DT are large dots, since the adjacent dots significantly overlap each other as described in FIG. 3, there is a tendency that there is hardly any excessive image quality deterioration due to the thinning-out when compared with the medium dot or the small dot having a little overlap between the adjacent dots. Meanwhile, in the medium dot, overlapping between the adjacent dots is small, and, in the small dot, overlapping between the adjacent dots is slight, so there is a tendency that image quality deterioration due to the thinning-out is visible, and thus there are limits to a low thinning-out degree. For example, when a user sets a dot reduction exceeding 60% by the dot reduction degree input section 140, a thinning-out corresponding to the set dot reduction degree is performed for the dot recording region DT constituted by the large dots, but a dot reduction (the small size diameter shrinkage and/or the thinning-out) of about 50% lower than the set dot reduction of 60% is performed for the dot recording region DT constituted by the medium dots or the small dots. In this way, when the thinning-out degree is varied according to the size of the dot, an appropriate thinning-out degree is set (limited) for each dot recording region DT of four rows by two columns, and thereby it is possible to suppress image quality deterioration even when the large dots, the medium dots and the small dots are mixed in an entire range of the image data.

C4. Modification Example 4

Although the overlapping printing where the number of main scanning passes is two has been described in the above-described embodiments, the invention is also applicable to an arbitrary overlapping printing where the number of main scanning passes is not two. For example, in overlapping printing where the number of main scanning passes is three, the above-described processing may be performed for each dot recording region DT so that the dot recording region DT is constituted by dots of four rows by three columns. The lines of the raster lines consecutively arranged in the sub-scanning direction is the same, and the dot recording region DT can be grasped as raster lines of three lines or five lines, so the dot recording region DT may be formed as a recording region of three rows by two columns or five rows by two columns.

C5. Modified Example 5

Although the printing head has moved in the main scanning direction in the above-described embodiments, printing paper may move instead of the printing head.

C6. Modified Example 6

Although the ink jet printer has been described in the above-described embodiments, the invention is applicable to other image recording devices such as a facsimile or a copier or the like. In addition, the invention is also applicable to a color material output device used for forming a color filter of a liquid crystal display or the like, an electrode material output device used for forming electrodes of an organic EL display or an FED (field emission display) or the like, or other color material output devices such as a living organic material output device used for manufacturing a bio chip. In this specification, the "printing head" refers to various kinds of recording heads used in an image recording device such as a printer or the like, a color material output head used for manufacturing a color filter of a liquid crystal display or the like, an electrode material output head used for forming electrodes of an organic EL display or an FED (field emission display) or the like, or a living organic material output head used for manufacturing a bio chip. The "printing medium" or the "dot recording medium" is not limited to paper but means a medium for forming dots thereon.

What is claimed is:

1. A recording medium recording a computer readable computer program thereon, the computer program enabling the computer to generate dot recording data supplied to a dot recording device in order to perform dot recording using the dot recording device which repeats a main scanning pass and a transport based on the dot recording data so that a raster line along a main scanning direction is formed in multiple lines in a sub-scanning direction on a printing medium, where the main scanning pass is for performing the dot recording on the printing medium when an output head having a plurality of nozzles arranged in the sub-scanning direction moves in the main scanning direction, and where the transport is for enabling the printing medium to move in the sub-scanning direction, the computer program enabling the computer to implement the functions of:

determining a dot reduction degree for reducing the dot recording;

setting a recording position of a changing target dot included in the dot recording data, according to the dot reduction degree, based on an order of performing the dot recording, where the changing target dot undergoes at least one of a thinning-out processing where the dot recording is not performed and a dot diameter shrinkage where dot size is reduced; and generating the dot recording data in which the recording position of the changing target dot is set.

2. The recording medium according to claim 1, wherein the computer program further enables the computer to implement the functions of:

setting recording positions of dots in the main scanning pass so that the order of performing the dot recording is not consecutive through one column in the sub-scanning direction in the dot recording region, when M×N dots in the dot recording region, which is taken up by N consecutive dots (where N is an integer equal to or more than 2) in the main scanning direction with respect to M raster lines (where M is an integer equal to or more than 2) consecutively arranged in the sub-scanning direction, are recorded by M×N main scanning passes; and determining the recording position of the changing target dot of the M×N dots in the dot recording region, according to the dot reduction degree, in the order of performing the dot recording.

3. The recording medium according to claim 1, wherein the computer program further enables the computer to implement the function of determining the recording position of the changing target dot so that the dot recording is sequentially performed starting from a first dot in the dot recording region or the dot recording is sequentially performed starting from a last dot in the dot recording region.

4. The recording medium according to claim 1, wherein the computer program further enables the computer to implement the function of assembling the dot recording data by repeatedly forming the dot recording region in which the recording position of the changing target dot is determined in the order of performing the dot recording, in the main scanning direction and in the sub-scanning direction.

5. The recording medium according to claim 1, wherein the computer program further enables the computer to implement the functions of:

setting recording positions of dots in the main scanning pass so that the order of performing the dot recording is not consecutive through one column in the sub-scanning direction in the dot recording region, when M×N dots in the dot recording region, which are taken up by N consecutive dots (where N is an integer equal to or more than 2) in the main scanning direction with respect to M raster lines (where M is an integer equal to or more than 2) consecutively arranged in the sub-scanning direction, are recorded by M×N main scanning passes;

determining the recording position of the changing target dot of the M×N dots in the dot recording region, according to the dot reduction degree, so that the dot recording is sequentially performed starting from a first dot in the dot recording region or the dot recording is sequentially performed starting from a last dot in the dot recording region; and assembling the dot recording data by repeatedly forming the dot recording region in which the recording position of the changing target dot is determined in the order of performing the dot recording, in the main scanning direction and in the sub-scanning direction.

6. A dot recording method, which repeats a main scanning pass and a transport based on dot recording data so that a raster line along a main scanning direction is formed in multiple lines in a sub-scanning direction on a printing medium, where the main scanning pass is for performing dot recording on the printing medium when an output head having a plurality of nozzles arranged in the sub-scanning direction moves in the main scanning direction, and where the transport is for enabling the printing medium to move in the sub-scanning direction, comprising:

determining a dot reduction degree for reducing the dot recording;

setting a recording position of a changing target dot included in the dot recording data, according to the dot reduction degree, based on an order of performing the dot recording, where the changing target dot undergoes at least one of a thinning-out processing where the dot recording is not performed and a dot diameter shrinkage where dot size is reduced; and generating the dot recording data in which the recording position of the changing target dot is set.

7. The dot recording method according to claim 6, further comprising:

setting recording positions of dots in the main scanning pass so that the order of performing the dot recording is not consecutive through one column in the sub-scanning direction in the dot recording region, when M×N dots in the dot recording region, which is taken up by N consecutive dots (where N is an integer equal to or more than 2) in the main scanning direction with respect to M raster lines (where M is an integer equal to or more than 2) consecutively arranged in the sub-scanning direction, are recorded by M×N main scanning passes; and determining the recording position of the changing target dot of the M×N dots in the dot recording region, according to the dot reduction degree, in the order of performing the dot recording.

8. The dot recording method according to claim 6, further comprising determining the recording position of the changing target dot so that the dot recording is sequentially performed starting from a first dot in the dot recording region or the dot recording is sequentially performed starting from a last dot in the dot recording region.

9. The dot recording method according to claim 6, further comprising assembling the dot recording data by repeatedly forming the dot recording region in which the recording position of the changing target dot is determined in the order of performing the dot recording, in the main scanning direction and in the sub-scanning direction.

10. The dot recording method according to claim 6, further comprising:

setting recording positions of dots in the main scanning pass so that the order of performing the dot recording is not consecutive through one column in the sub-scanning direction in the dot recording region, when M×N dots in the dot recording region, which is taken up by consecutive dots (where N is an integer equal to or more than 2) in the main scanning direction with respect to M raster lines (where M is an integer equal to or more than 2) consecutively arranged in the sub-scanning direction, are recorded by M×N main scanning passes;

determining the recording position of the changing target dot of the M×N dots in the dot recording region, according to the dot reduction degree, so that the dot recording is sequentially performed starting from a first dot in the dot recording region or the dot recording is sequentially performed starting from a last dot in the dot recording region; and assembling the dot recording data by repeatedly forming the dot recording region in which the recording position of the changing target dot is determined in the order of performing the dot recording, in the main scanning direction and in the sub-scanning direction.

11. A dot recording device, which repeats a main scanning pass and a transport based on dot recording data so that a raster line along a main scanning direction is formed in multiple lines in a sub-scanning direction on a printing medium, where the main scanning pass is for performing dot recording on the printing medium when an output head having a plurality of nozzles arranged in the sub-scanning direction moves in the main scanning direction, and where the transport is for enabling the printing medium to move in the sub-scanning direction, comprising:

a dot reduction degree determination section configured to determine a dot reduction degree for reducing the dot recording;

a thinning-out processing section configured to set a recording position of a changing target dot included in the dot recording data, according to the dot reduction degree, based on an order of performing the dot recording, where the changing target dot undergoes at least one of a thinning-out processing where the dot recording is not performed and a dot diameter shrinkage where dot size is reduced; and a dot data generation section configured to generate the dot recording data in which the recording position of the changing target dot is set.

12. The dot recording device according to claim 11, wherein the thinning-out processing section determines the recording position of the changing target dot of M×N dots in a dot recording region in the order of performing the dot recording, according to the dot reduction degree, based on data where recording positions of dots in the main scanning pass are set so that the order of performing the dot recording is not consecutive through one column in the sub-scanning direction in the dot recording region, when the M×N dots in the dot recording region, which is taken up by N consecutive dots (where N is an integer equal to or more than 2) in the main scanning direction with respect to M raster lines (where M is an integer equal to or more than 2) consecutively arranged in the sub-scanning direction, are recorded by M×N main scanning passes.

13. The dot recording device according to claim 11, wherein the thinning-out processing section determines the recording position of the changing target dot so that the dot recording is sequentially performed starting from a first dot in the dot recording region or the dot recording is sequentially performed starting from a last dot in the dot recording region.

14. The dot recording device according to claim 11, wherein the dot recording region in which the recording position of the changing target dot is determined in the order of performing the dot recording is formed repeatedly in the main scanning direction and in the sub-scanning direction, to assemble the dot recording data.

15. The dot recording device according to claim 11, wherein the dot recording device is an ink jet printer.

16. The dot recording device according to claim 11, determining the recording position of the changing target dot of M×N dots in a dot recording region in the order of performing the dot recording according to the dot reduction degree so that the dot recording is sequentially performed starting from a first dot in the dot recording region or the dot recording is sequentially performed starting from a last dot in the dot recording region, based on data where recording positions of dots in the main scanning pass are set so that the order of performing the dot recording is not consecutive through one column in the sub-scanning direction in the dot recording region when the M×N dots in the dot recording region, which is taken up by N consecutive dots (where N is an integer equal to or more than 2) in the main scanning direction with respect to M raster lines (where M is an integer equal to or more than 2) consecutively arranged in the sub-scanning direction, are recorded by M×N main scanning passes, and assembling the dot recording data by repeatedly forming the dot recording region in which the recording position of the changing target dot is determined in the order of performing the dot recording, in the main scanning direction and in the sub-scanning direction, wherein the dot recording device is an ink jet printer.

* * * * *